United States Patent [19]

Abdulhafiz et al.

[11] Patent Number: 5,454,093

[45] Date of Patent: Sep. 26, 1995

[54] BUFFER BYPASS FOR QUICK DATA ACCESS

[75] Inventors: Jamee Abdulhafiz, Endicott; Manuel J. Alvarez, II, Binghamton; Glenn D. Gilda, Endicott, all of N.Y.

[73] Assignee: International Business Machines Corporation, Armonk, N.Y.

[21] Appl. No.: 660,468

[22] Filed: Feb. 25, 1991

[51] Int. Cl.$^6$ .................................................. G06F 13/00
[52] U.S. Cl. ...................... 395/460; 395/550; 395/465; 395/494; 364/DIG. 1; 365/189.05; 365/233
[58] Field of Search ........................... 364/DIG. 1, 964.5, 364/964.6, 964.341, 964.343, 243.41; 365/189.05, 233; 395/425, 550

[56] References Cited

U.S. PATENT DOCUMENTS

| | | | |
|---|---|---|---|
| 3,800,292 | 3/1974 | Curley et al. | 340/172.5 |
| 3,820,078 | 6/1974 | Curley et al. | 340/172.5 |
| 4,075,686 | 2/1978 | Calle et al. | 364/200 |
| 4,169,284 | 9/1979 | Hogan et al. | 364/200 |
| 4,189,770 | 2/1980 | Gannon et al. | 364/200 |
| 4,268,907 | 5/1981 | Porter et al. | 364/200 |
| 4,354,232 | 10/1982 | Ryan | 364/200 |
| 4,442,487 | 4/1984 | Fletcher et al. | 364/200 |
| 4,464,717 | 8/1984 | Kelley et al. | 364/200 |
| 4,467,414 | 8/1984 | Akagi et al. | 364/200 |
| 4,494,190 | 1/1985 | Peters | 364/200 |
| 4,502,110 | 2/1985 | Saito | 364/200 |
| 4,521,850 | 6/1985 | Wilhite et al. | 364/200 |
| 4,551,799 | 11/1985 | Ryan et al. | 364/200 |
| 4,685,082 | 8/1987 | Cheung | 364/200 |
| 4,742,446 | 5/1988 | Morioka et al. | 364/200 |
| 4,823,259 | 4/1989 | Aichelmann, Jr. et al. | 364/200 |
| 4,881,163 | 11/1989 | Thomas et al. | 364/200 |
| 4,884,198 | 11/1989 | Garner et al. | 364/DIG. 1 |
| 4,953,077 | 8/1990 | Alvarez, II et al. | 364/200 |
| 5,019,965 | 5/1991 | Webb, Jr. et al. | 364/DIG. 1 |
| 5,041,962 | 8/1991 | Lunsford | 364/DIG. 1 |

FOREIGN PATENT DOCUMENTS 0304587 3/1989 European Pat. Off. .

OTHER PUBLICATIONS

IBM TDB, vol. 25, No. 8, Jan. 1983, pp. 4390–4392 Asynchronous Data Transfer Buffer for MP Systems.
IBM TDB, vol. 29, No. 10, Mar. 1987, pp. 4624–4625 Overlap of Cache–to–Cache Transfer with Outpage Opertion within a Dual–Processor Machine.
IBM TDB, vol. 28, No. 3, Aug. 1985, pp. 1169–1170 Shared Castout Buffer.

Primary Examiner—David L. Robertson
Assistant Examiner—James Peikari
Attorney, Agent, or Firm—Arthur J. Samodovitz

[57] ABSTRACT

A computer system comprises a data processor, a main memory, a cache memory and an inpage buffer. The cache memory is coupled to the main memory to receive data therefrom and is coupled to the processor to transfer data thereto. The inpage buffer is coupled to the main memory to receive data therefrom, coupled to the cache memory to transfer data thereto, and coupled to the processor to transfer data thereto. Part of a line of data is originally transferred to the cache memory bypassing the inpage buffer to give the processor immediate access to the data which it needs. The remainder of the line of data is subsequently transferred to the inpage buffer, and then the processor is given access to the contents of the inpage buffer. The processor accesses the data in the cache memory with one set of clocks while the remainder of the line of data is transferred to the inpage buffer with another set of clocks. The two sets of clocks optimize the operation of tile processor and the main memory. Subsequently, the contents of the inpage buffer are transferred to the cache memory at the start of another inpage operation while the next line of data is fetched from the main memory.

28 Claims, 15 Drawing Sheets

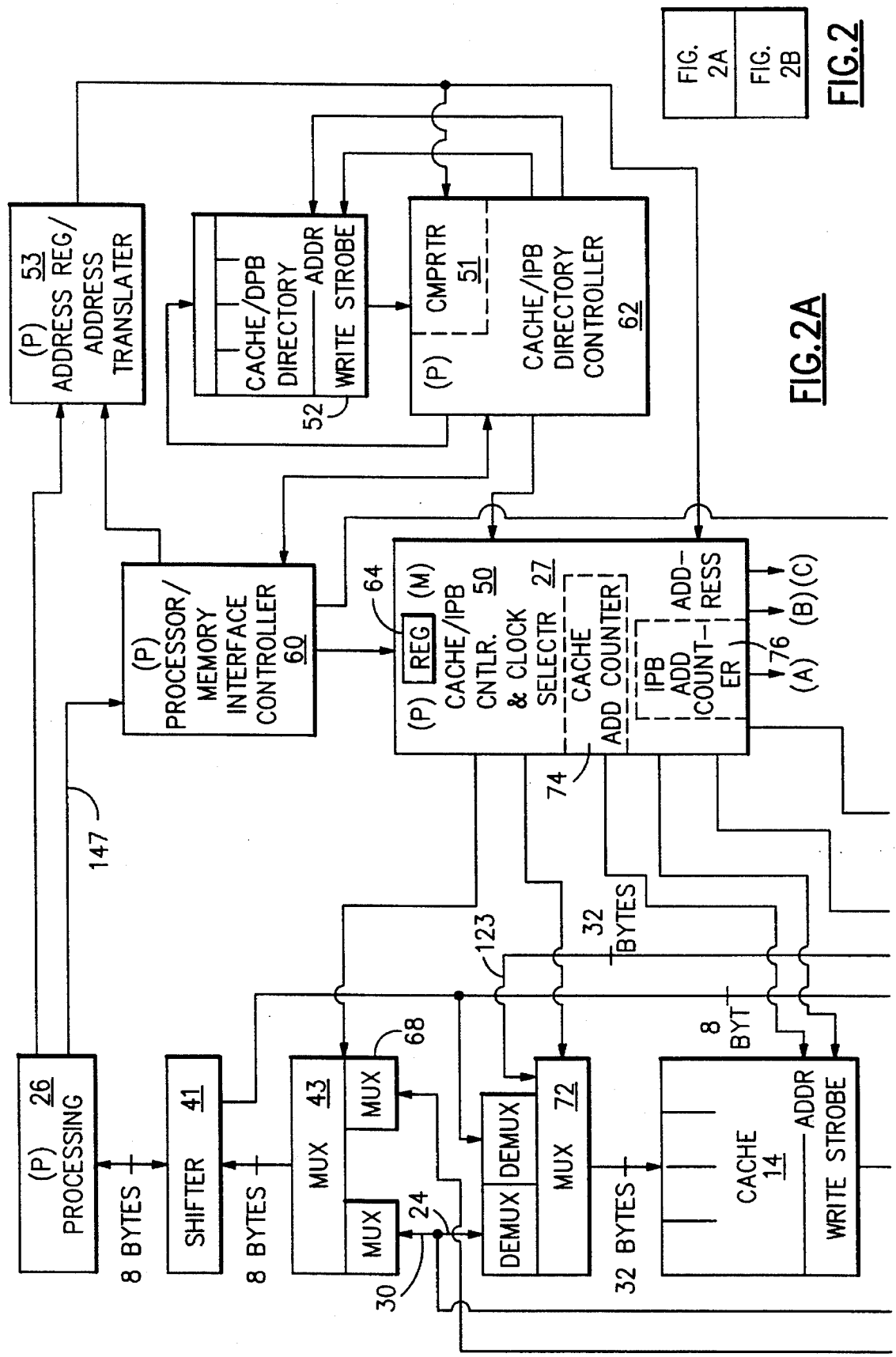

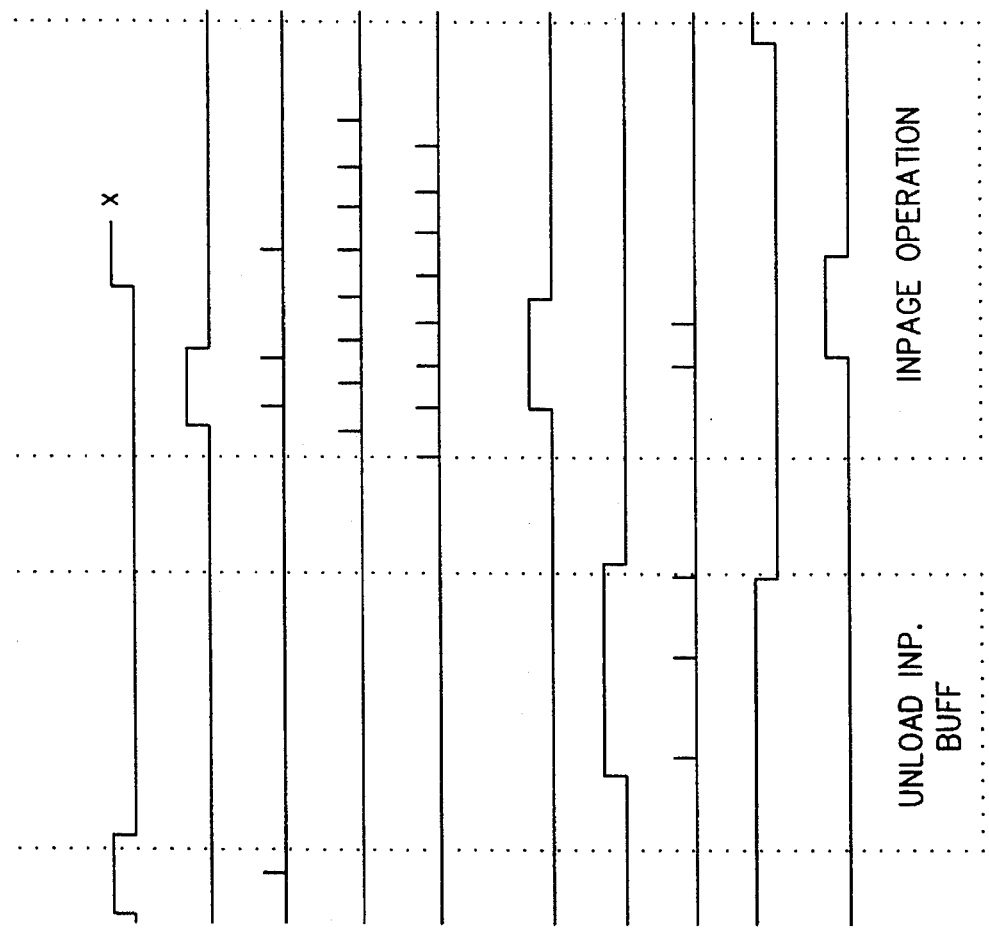

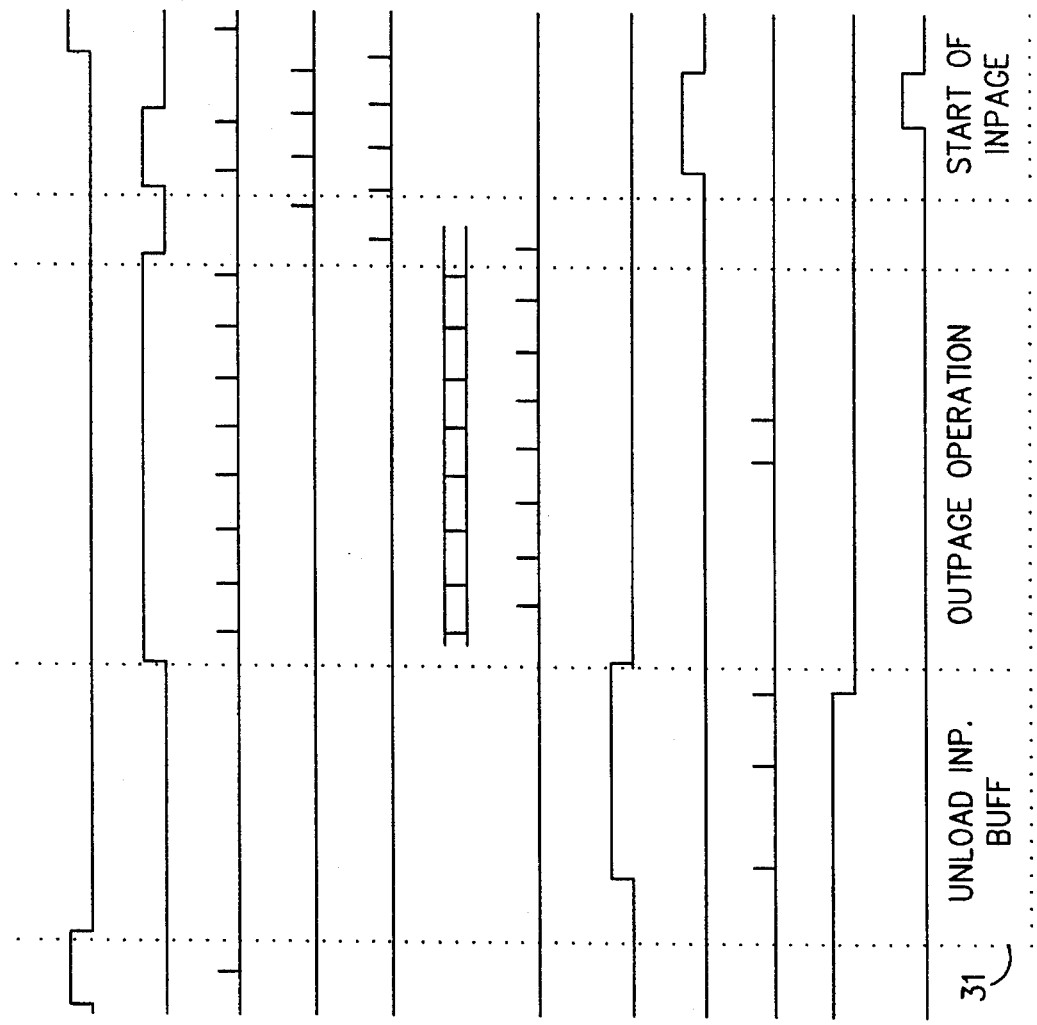

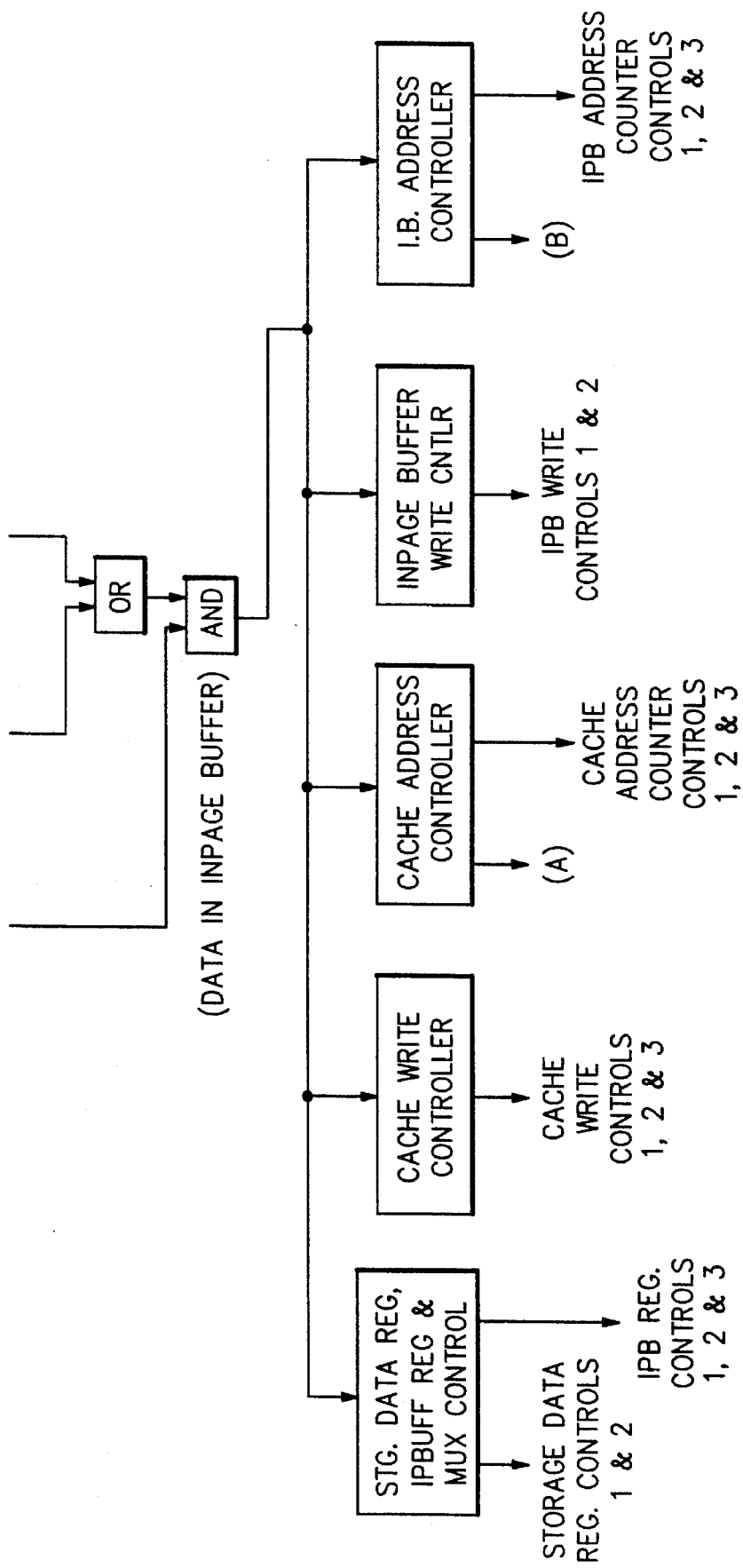

BUFFER BYPASS FOR QUICK DATA ACCESS

BACKGROUND OF THE INVENTION

The present invention relates generally to computer systems, and deals more particularly with high speed access by a computer processor of data from main memory via an intermediary inpage buffer and cache memory.

Computer systems often incorporate large capacity main memories such as RAM or ROM with megabytes of storage capacity. The speed of the processor within such a computer system is typically much faster than the rate at which data can be accessed or fetched from the main memory. The data fetch from the main memory is relatively slow because the main memory is so large that relatively inexpensive semiconductor technology is used to avoid exorbitant costs. For example, a large main memory may utilize a dynamic random access memory (DRAM) technology whereas a faster, more expensive technology currently available is static random access memory (SRAM). Also, regardless of the technology that is utilized, there are inherent delays in accessing a large memory.

One technique to increase the rate at which data can be accessed by a computer processor from main memory without dramatically increasing the cost of the computer system is to provide a cache memory between the main memory and the processor. The cache memory is a relatively low capacity memory that utilizes the latest, fastest technology (which is more expensive than the main memory per unit of storage). There may also be a low capacity, high speed buffer located between the cache memory and the main memory to participate in the data transfer.

The cache memory is usually local to the processor and contains a time-varying sub-set of the contents of main memory. The cache memory derives its performance enhancement from the principle of locality. According to this principle, over short periods of time, the data required by the processor tends to be clustered in both time and space. In other words, data that will be required in the near future is likely to have been used recently by the processor or located near to the data which was used recently by the processor. In practice, a cache memory can contain a small fraction of the data stored in main memory, yet still have "hit" rates that are extremely high under normal system conditions. Thus, the data that is most likely required by the processor at any time is temporarily stored in the cache memory, and the high speed of the cache memory matches that of the processor.

According to the prior art, the most recent data requested by the processor from main memory can be stored in the cache memory simultaneously with its transfer to the processor. Other data located adjacent to the requested data in main memory is also transferred to the cache memory. Subsequent requests for this data by the processor result in the transfer of data directly from the high speed cache memory to the processor without the need to access the main memory. During operation, when the processor requests data, a directory located in a separate memory and associated with the cache memory is searched. If this search determines that the data is stored in the cache memory, a hit occurs, and the data is transferred to the processor from the cache memory in one or two processor cycles. However, if the requested data is not currently stored in the cache memory, a "miss" occurs, and the data along with other adjacent data is then retrieved from main memory.

Often times, the amount of data that is transferred from main memory to cache memory following a miss is one "line" of data which contains the requested data and additional data located adjacent to the requested data. A main memory "line fetch" or "inpage" operation occurs when the cache memory fetches a line of data from the main memory. A "line castout" or "outpage" operation occurs when a line of data is returned to main memory from the cache memory after modification by the processor to make room for a new line of data in the cache memory.

A line of data is typically 4–16 times longer than the width of a bus between the cache memory and the main memory. Consequently, multiple transfers of data between main memory and cache memory are required to transfer a line of data, and the inpaging of a line of data may take an appreciable amount of time due to the limitations of the bus. It was previously known as noted above to transmit particular data within a line which is required by the processor directly from the main memory to the processor so that the processor can process the data without waiting for the entire line of data to be transferred first to the cache memory. In this prior art system, the remainder of the line is then inpaged into the cache memory immediately after the direct transfer from main memory to the processor.

European Patent Application 88110696.7 (Publication 304,587 A2) by Thomas L. Jeremiah discloses a system for interrupting loading of data into a cache memory from main memory. A buffering device is connected between main memory and the cache memory for buffering data to be loaded into the cache memory. The buffer receives data from the main memory continuously, and transfers the data to the cache memory continuously unless the cache memory is being accessed by the processor. The processor can access the data from the cache memory before the data transfer from the main memory to the cache memory is completed. Data from the inpage buffer can also be gated through a multiplexer via a bus to the processor to allow early access to data not yet written into the cache memory. In practice, all data from the cache line being inpaged is obtained from the inpage buffer, except for the first access which is bypassed directly from a data register to the processor, until the complete cache line is written into the cache memory and the directory is marked valid.

U.S. Pat. No. 4,953,077 discloses an IBM 4381 computer system (models 23, 24, 91 and 92) comprising a processor 22, main memory 12, and cache memory 14. A controller 18 including a clock 20 controls data transfer directly from main memory 12 to cache memory 14, and a controller 26 with an associated clock 28 controls data transfer between cache memory 14 and processor 22.

In the prior art IBM 4381 computer system (models 23, 24, 91 and 92), the computer processor cannot access the cache memory until a line has been completely loaded from the main memory to the cache memory. The computer system implements an inpage/outpage control sequence referred to as a "fast transfer mode" (FTM) in which the computer processor and the memory/data transfer operate with different sets of clocks. Clocks 20 and 28 of U.S. Pat. No. 4,953,077 have different cycle times.

A general object of the present invention is to improve the speed of access of main memory data by a computer processor.

Another object of the present invention is to provide access of main memory data by a computer processor while permitting the processor and main memory to operate at maximum speed.

SUMMARY OF THE INVENTION

The invention resides in a computer system comprising a data processor, a main memory, a cache memory and an inpage buffer. The cache memory is coupled to the main memory to receive data therefrom and is coupled to the processor to transfer data thereto. The inpage buffer is coupled to the main memory to receive data therefrom, coupled to the cache memory to transfer data thereto, and coupled to the processor to transfer data thereto. Part of a block or line of data is initially transferred to the cache memory bypassing the inpage buffer, to give the processor immediate access to the data which it needs. The remainder of the line or block of data is subsequently transferred to the inpage buffer, and then the processor is given access to the contents of the inpage buffer. Subsequently, the contents of the inpage buffer are transferred to the cache memory at the start of another inpage operation.

According to one feature of the invention, the processor accesses the data in the cache memory with one set of clocks while the remainder of the line or block of data is transferred to the inpage buffer with another set of clocks. The two sets of clocks are needed to optimize the operation of the processor and data transfers between main memory and cache memory.

According to another feature of the invention, during the time that the contents of the inpage buffer are transferred into the cache memory, a fetch operation is begun in the cache memory to fetch another block or line of data for subsequent transmission to the cache memory and the inpage buffer noted above, Because of the overlapped transfer of the data from the inpage buffer to the cache memory and the fetching of the next block or line of data from the main memory, the data access system is optimized further.

Figure 2B:
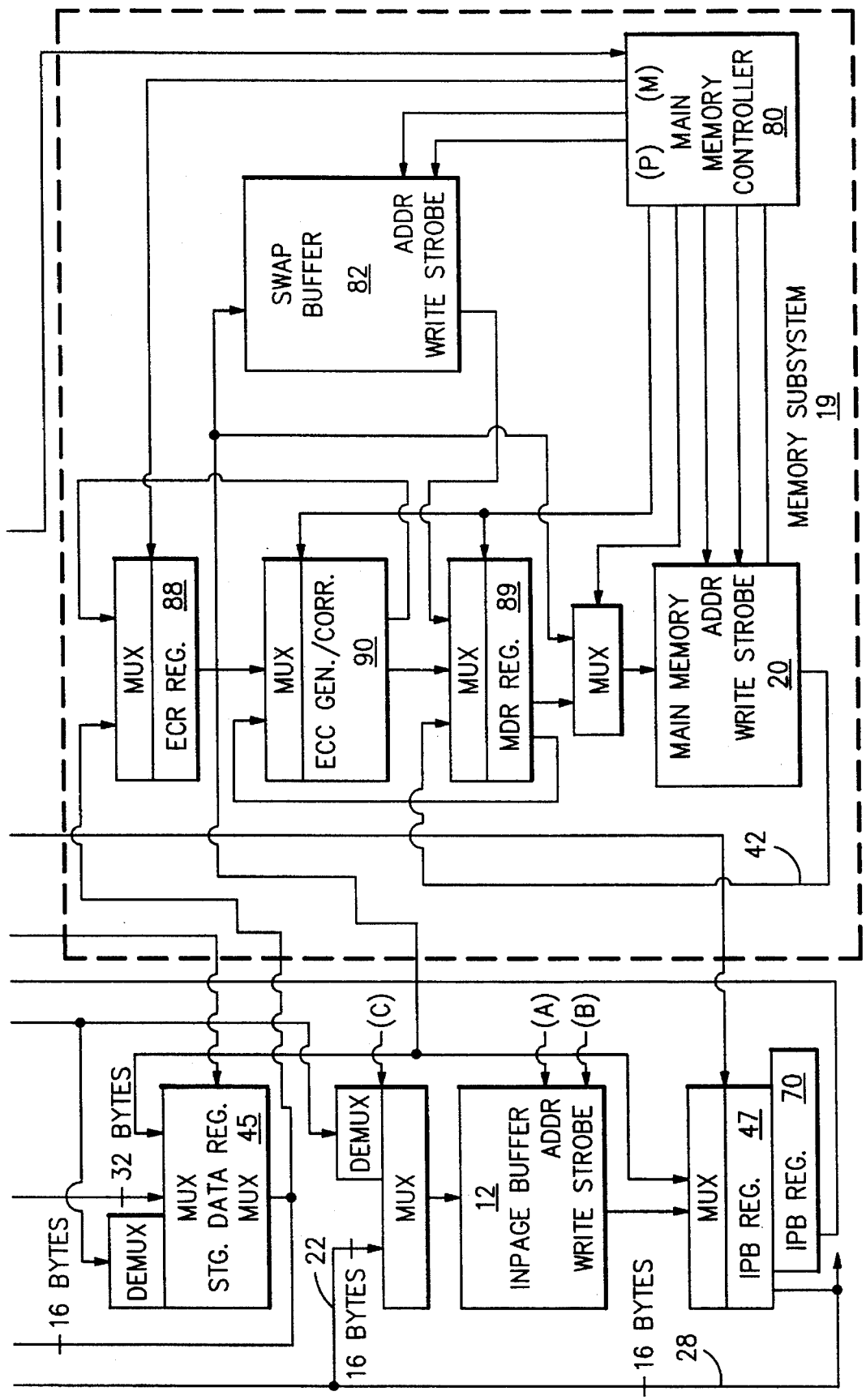
FIG. 2 is a more detailed block diagram of FIG. 1.

FIG, 4 is a timing diagram for the components illustrated in FIG. 2 for an outpage operation.

Figure 5:
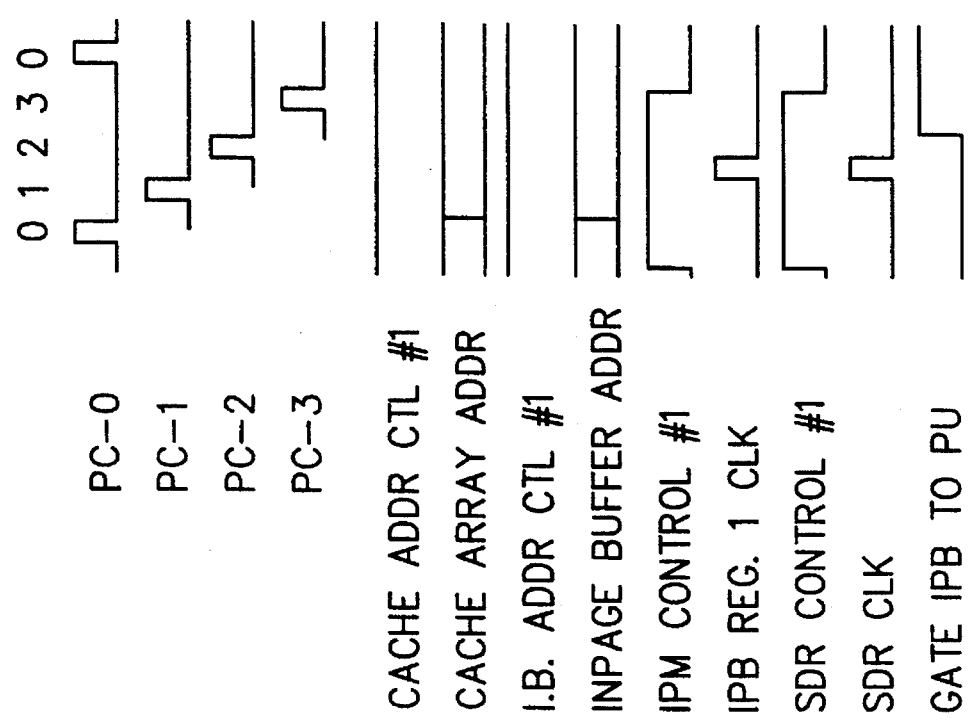

FIG. 5 is a timing diagram for the components illustrated in FIG. 2 for a processor read request and resultant events where the requested data is found in the inpage buffer.

Figure 6:
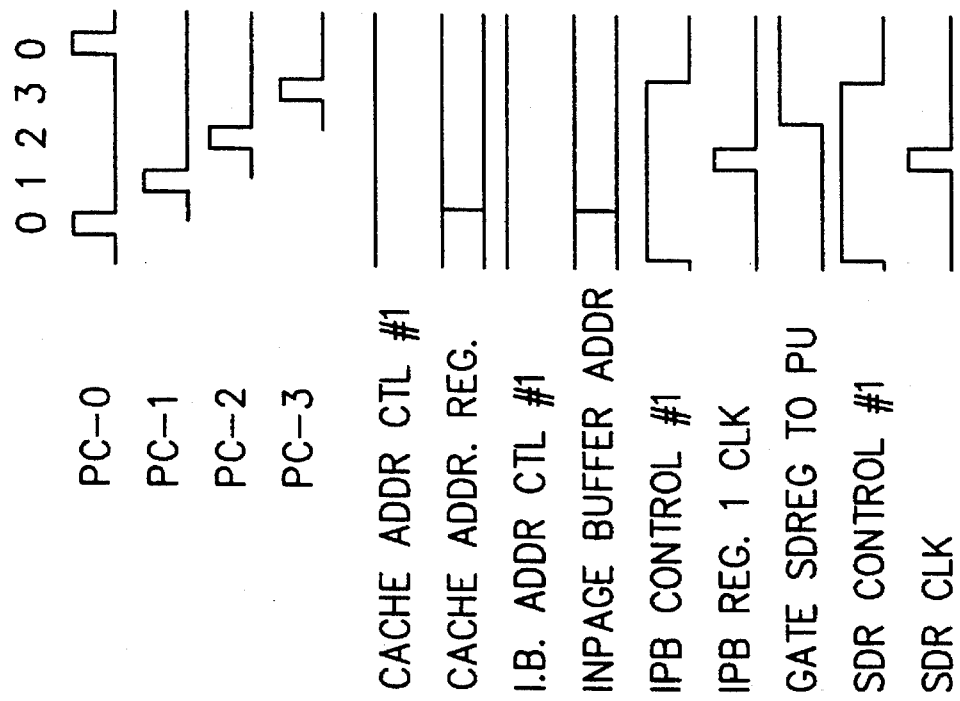

FIG. 6 is a timing diagram for the components of FIG. 2 for a processor read request and resultant events where the requested data is found in cache memory.

Figure 7:
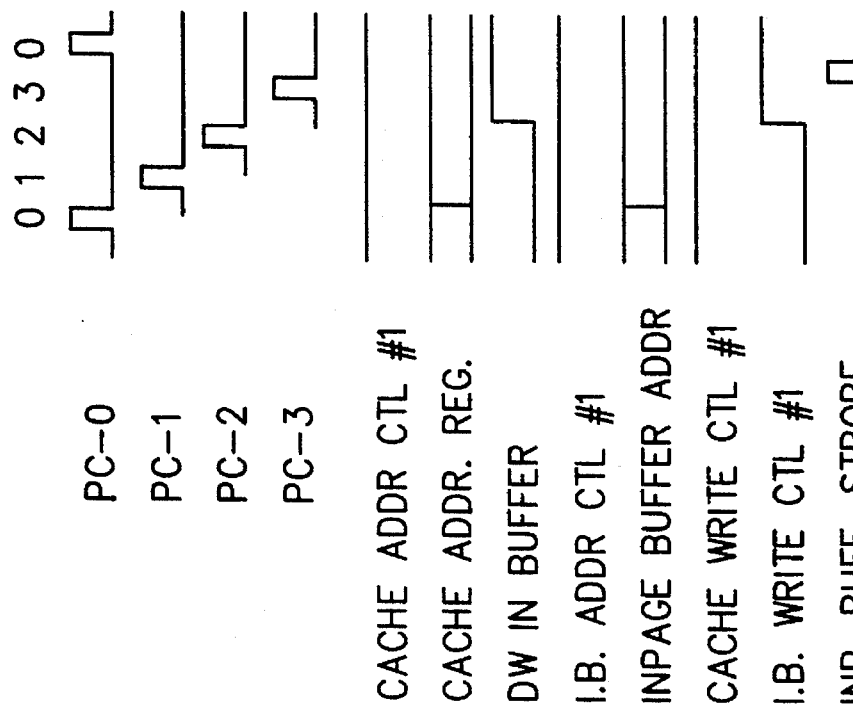

FIG. 7 is a timing diagram for the components of FIG. 2 for a processor write request where the data is written into the inpage buffer.

Figure 8:
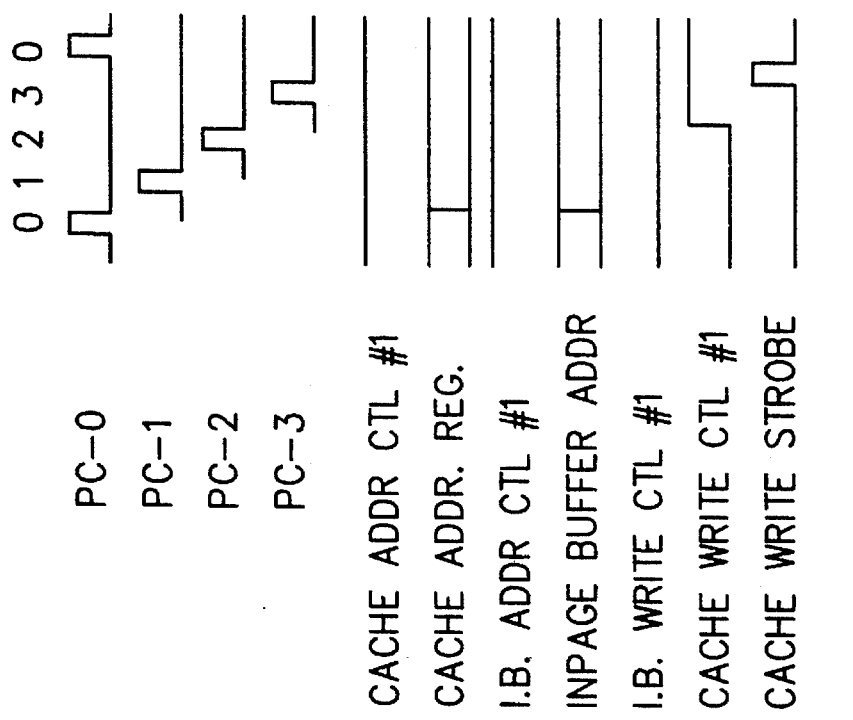

FIG. 8 is timing diagram for the components of FIG. 2 for a processor write request where the data is written into the cache memory.

Figure 9A:
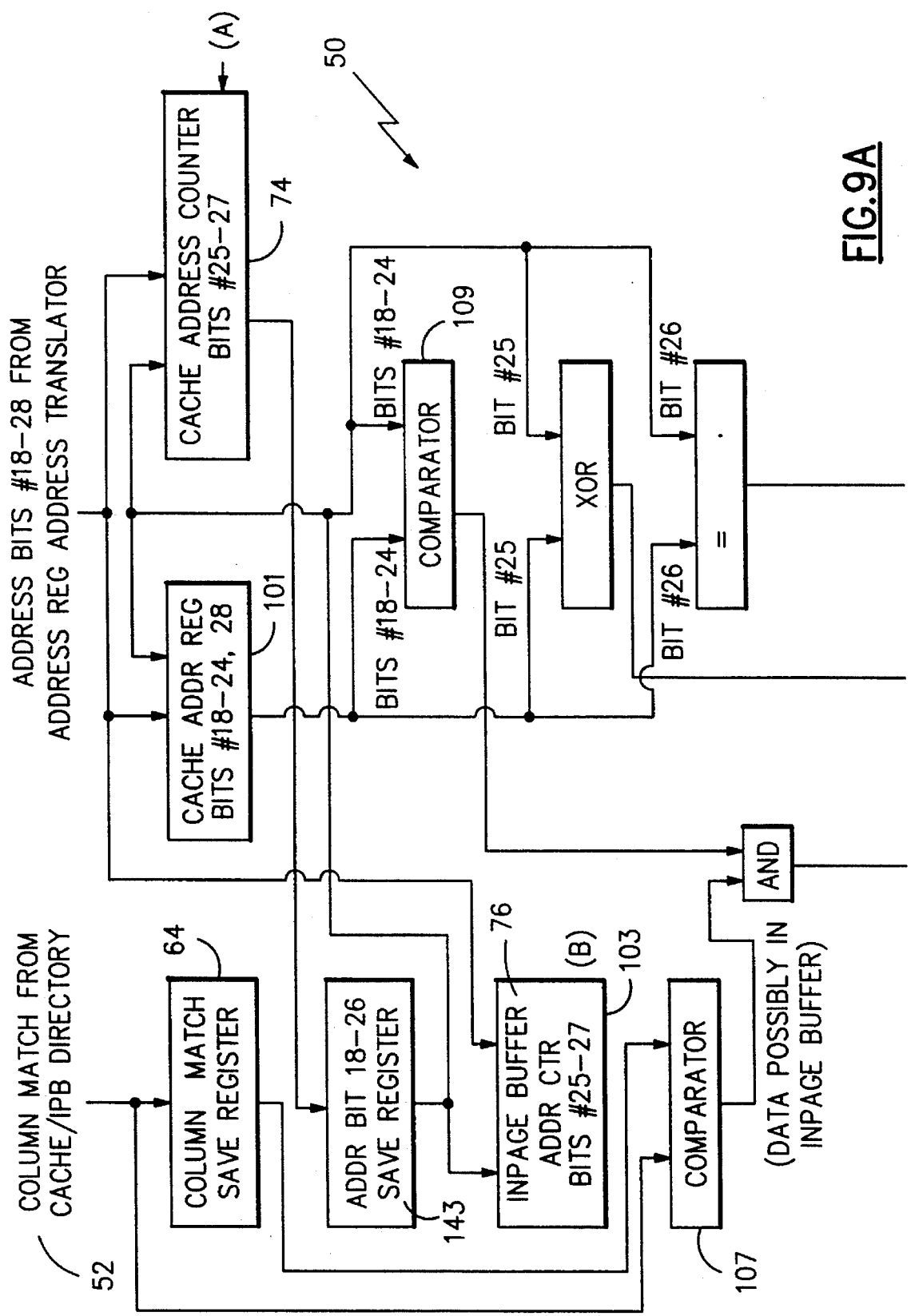

FIG. 9 is a more detailed block diagram of a Cache/IPB Controller of FIG 2.

Figure 10A:
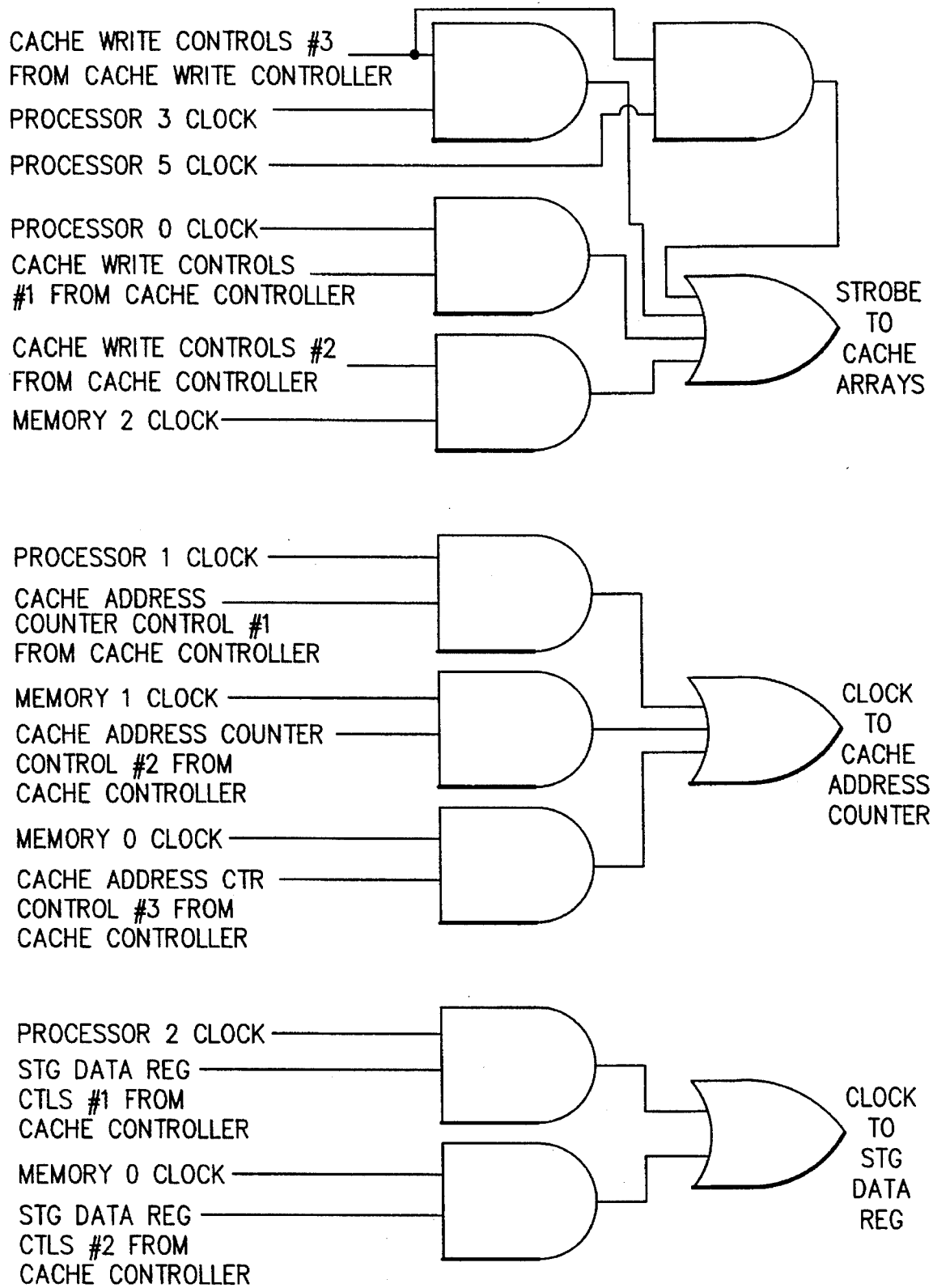
Figure 10B:
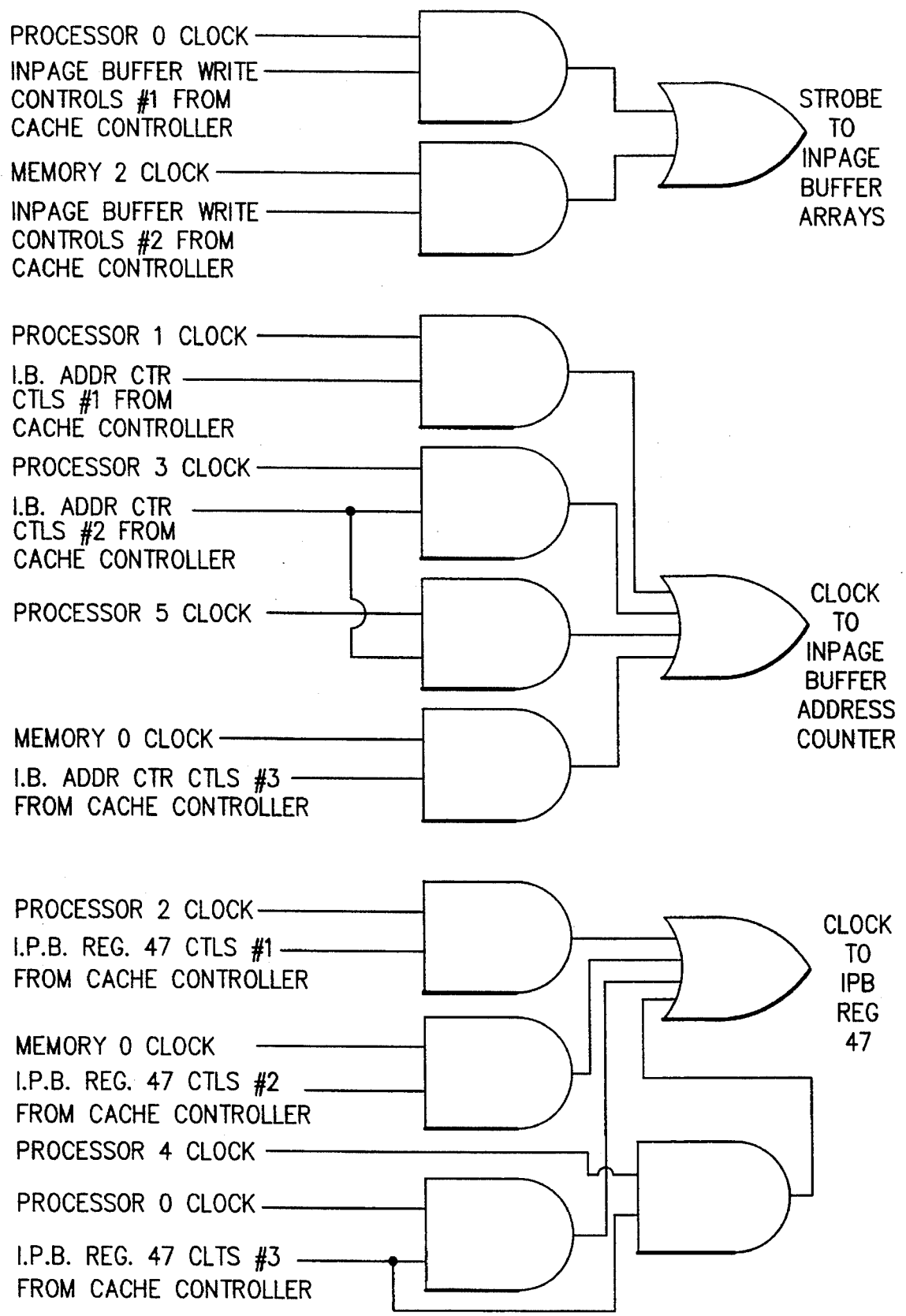

FIGS. 10A and 10B are detailed, digital logic diagrams of a Clock Selector Controller of FIG. 2.

DETAILED DESCRIPTION OF THE PREFERRED EMBODIMENT

Figure 1:
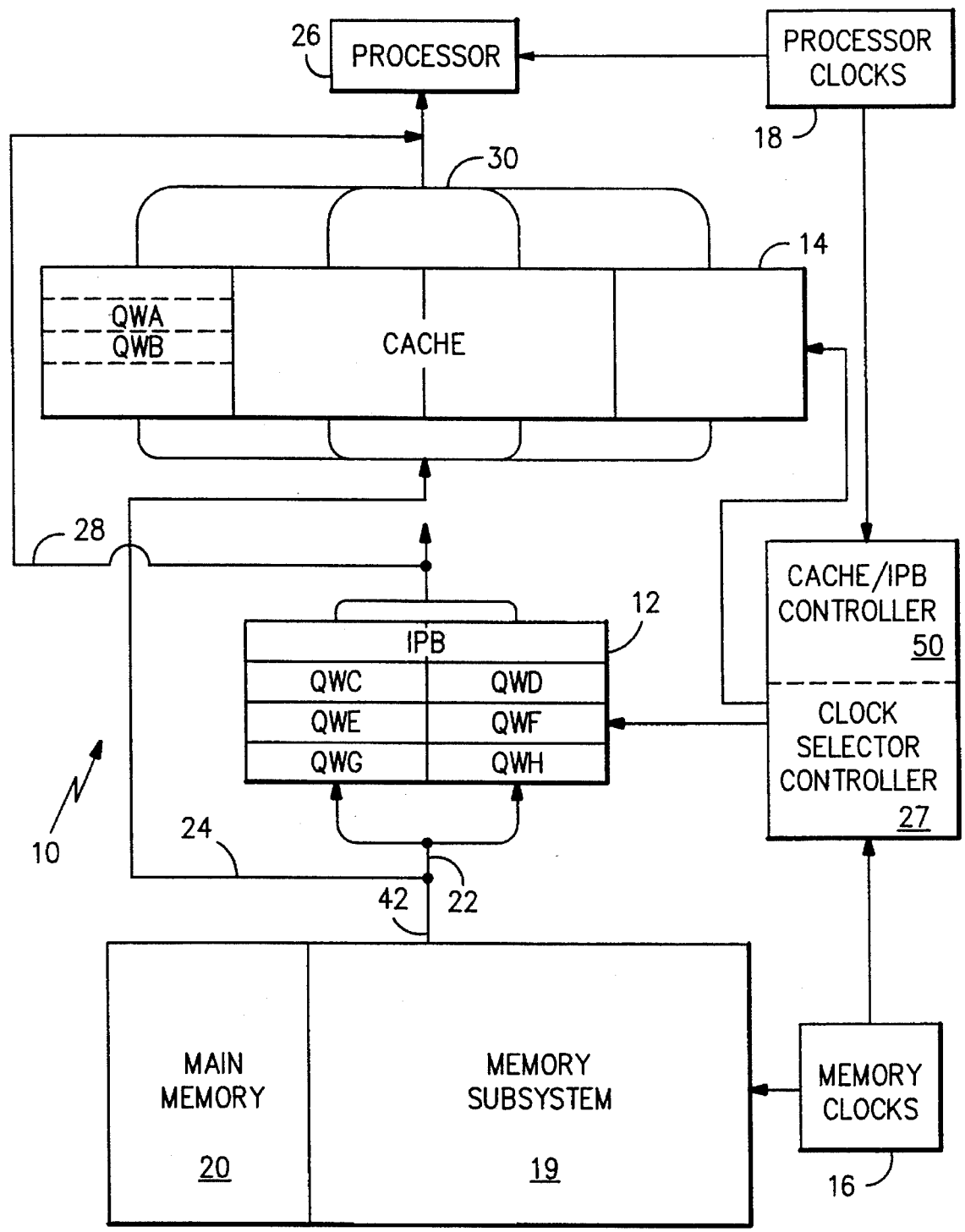
FIG. 1 is a block diagram of data accessing components of the computer system according to the present invention.

Referring now to the Figures in detail wherein like reference numerals indicate like elements throughout the several views, FIG. 1 illustrates a data access system generally designed 10 according to the present invention. System 10 permits a processor 26 to access data from main memory 20, and comprises an inpage buffer 12, a cache memory 14, a set of memory timing signals or clocks 16, a set of processor timing signals or clocks 18, a cache/IPB controller 50 and a clock selector controller 27.

By way of example, main memory 20 comprises DRAM technology, inpage buffer 12 comprises SRAM technology, and cache memory 14 comprises SRAM technology. In the illustrated example, a page or line of data is eight quad words long, and inpage buffer 12 stores six quad words in six of eight total locations where each quad word is 16 bytes in length. The extra two locations are provided to permit direct use of system address hits to access the inpage buffer; the two quad words containing the data which is initially requested by the processor may reside anywhere within a predefined page read from main memory, and the corresponding two quad word positions in the inpage buffer are not filled. Cache memory 14 is a four-way associative cache i.e. it is divided into four columns or slots. Each slot can store 16 kilobytes of data.

A main memory subsystem 19 (which includes main memory 20) can write data into inpage buffer 12 via data lines 22 and can also write data into cache memory 14 via data lines 24. All transfers of data from main memory 20 to inpage buffer 12 and cache memory 14 are timed by the set of memory or "fast transfer" clocks 16. The processor 26 can read data from inpage buffer 12 via data lines 28 and can read data from cache memory 14 via data lines 30. All reading of data by processor 26 from inpage buffer 12 and cache memory 14 are timed by the set of processor or "conventional system" clocks 18. As described in more detail below, the cache/IPB controller 50 and clock selector controller 27 apply the appropriate clocks to the inpage buffer 12 and the cache memory 14 to time the foregoing data transfers. Also, in the preferred embodiment of the invention, the cycle time for the memory (or fast-transfer) clocks is shorter than the cycle time for the processor (or conventional system) clocks. The processor cycle time is the minimum time required by the processor to execute one processor microword, and the memory cycle time is the time required to transfer one pair of double words out of a main memory register (to MDR register 88, FIG. 2). The use of the different clocks optimizes the processor operations and the data transfers between cache memory and main memory.

When processor 26 requests a double word of data that is not found in either cache memory 14 or inpage buffer 12, one line of data containing the double word is transferred from main memory 20 to inpage buffer 12 and cache memory 14 in the following manner. Two quad words which include the requested data are initially transferred to the cache memory bypassing the inpage buffer, and then the remaining six quad words of the line are transferred to the inpage buffer. Usually (as illustrated in FIG. 1), the first or second quad word, QWA or QWB, includes the requested data, and this scenario is described in more detail below. However, when another quad word QWC-QWH, includes the initially requested data, then this quad word and the adjacent one are initially transferred to the cache memory instead of quad words QWA and QWB. In the illustrated example, the first quad word, QWA, in the line is initially transferred from main memory 20 to cache memory 14 with timing according to the set of memory clocks 16. Then, another quad word, QWB, (from an adjacent location in main memory 20) is also transferred to cache memory 14 with timing by the set of memory clocks 16 and stored in an adjacent cache memory address in the same slot. Then, the cache/IPB controller 50 and clock selector controller 27 release the cache memory 14 from the set of memory clocks, and apply the set of processor clocks 18 to the cache memory 14. Thus, processor 26 can now access the two recently transferred quad words without waiting for the transfer of the remaining six quad words, QWC-QWH. While the processor 26 processes the requested double word and any of the other three double words from the first and second quad words just transferred to the cache memory 14, the cache/IPB controller 50 and clock selector controller 27 apply the set of memory clocks 16 to inpage buffer, and the remaining six quad words of the line of data are transferred from main memory 20 to inpage buffer 12. Then, the cache/IPB controller 50 and clock selector controller 27 release the inpage buffer 12 from the set of memory clocks 16 and apply the set of processor clocks 18 to the inpage buffer. Thus, processor 26 can now access and process the latter six quad words of the line of data that are stored in the inpage buffer, as well as the first two quad words of the same line of data which are presently stored in the cache memory 14.

In a typical scenario based on the principal of locality, processor 26 proceeds to access and process several of the double words contained in the line of data which was recently transferred to cache memory 14 and inpage buffer 12. However, at a later time, processor 26 will require data that is not found in either cache memory 14 or the inpage buffer 12. At that time, processor 26 will cause the cache/IPB controller 50 to initiate the transfer of the contents of the inpage buffer 12 (the latter six quad words of the line of data) to cache memory 14 (with timing by the set of processor clocks) at the six quad word locations in the same column and adjacent to the first two quad words, QWA and QWB, which were transferred directly from main memory to the cache memory. This transfer makes room for subsequent transfers to the the inpage buffer 12 because the inpage buffer is only capable of holding enough data for one inpage operation. The latter six quad words then overwrite any previous quad words that were written into these locations in the cache memory. While the latter six quad words are being transferred from the inpage buffer to the cache memory, main memory 20 begins to fetch another line of data which contains the new double word requested by processor 26. The transfer of data from main memory to cache memory during and after this fetching operation occurs with timing by the set of memory clocks 16.

The following advantages result from system 10. The data immediately needed by the processor is written from the main memory into the cache memory bypassing the inpage buffer to speed the data access by the processor. Also, the processor can access the requested data in cache memory (with one set of clocks) while the inpage operation is completed to the inpage buffer (with another set of clocks). The two sets of clocks optimize the operation of the processor and the main memory; the transfer of data to cache memory operates optimally with a faster clock cycle than the processor operations. In addition, the subsequent transfer of the remainder of the line of data in the inpage buffer to the cache memory is overlapped with the fetching of the next line of data from main memory to further optimize the data access and transfer process.

The following is a more detailed description of the circuitry of the data access system 10, with reference to FIG. 2. As described in more detail below, a cache/IPB controller 50 and a clock selector controller 27 apply the set of processor clocks to inpage buffer 12 and cache memory 14 while the processor 26 processes data residing in either the cache memory 14 or the inpage buffer 12, or does other work not requiring other data stored in main memory 20. The processor 26, processor memory interface controller (60), address register/address translation unit (53) and cache/IPB directory controller 62 always use the processor clocks. When the processor requires data, the processor sends a data read request to a processor/memory interface controller 60, and sends a virtual address of the requested data to address register/address translater 53. The translater 53 includes an address translation look aside buffer table, and when the first 20 bits indicate (from the translation look aside buffer table) that the data can be found in main memory 20, the address register/address translater converts the virtual address to a 26 bit absolute address (address bits 6 to 31) representing the absolute address of the data in main memory 20. Only 26 bits are used in the illustrated example because that is the capacity of the main memory. This absolute address is sent to cache/IPB directory controller 62 to determine if the requested data can be found either in cache memory or the inpage buffer. The cache/IPB directory includes a list or directory of all data that is currently contained in the cache memory and inpage buffer. The cache/IPB directory is divided into four columns with each column holding 128 entries. Each entry is addressed using address bits 18–24. Each entry contains 12 bit addresses consisting of address bits 6-17 and other control bits indicating the status of the entry (valid, invalid, modified, off line). These 12 bit addresses are the addresses of all 128 byte blocks of data stored either wholly in cache or partially in cache with the remainder stored in the inpage buffer. Then the cache/IPB directory controller 62 reads one entry for each of the four columns using address bits 18–24, and compares (using comparator 51) the address entry to the absolute address bit 6–17 from the address register/address translater, and also tests the status of each entry. If a match occurs, this indicates that the data can be found in either the cache memory 14 or the inpage buffer 12, and the next step is to determine which of the cache memory or the inpage buffer actually contains the data. This determination is made by the cache/IPB controller 50 as follows. Whenever a new 128 byte block page or line is transferred from main memory to the inpage buffer and cache memory (also known as an inpage operation), registers 64 and 143 (FIG. 9) in the cache/IPB controller 50 are updated with column and row information (address bits 18–24) which indicates the location in the cache/IPB directory that contains the absolute address of the most recently transferred data block (which is split between the inpage buffer and the cache memory). The cache/IPB controller 50 also receives absolute address bits 18–28 from the address register/address translater (which bits are stored in registers 101 and 74, see FIG. 9). In the case where a match occurs in the cache directory controller of the previously described comparison, the cache directory controller 62 notifies the cache controller 50 of the cache directory column that contains the data address. This column information compared (using a comparator 107) with the register 64 in the cache/IPB controller 50 that contains the column used for the last inpage operation from main memory to cache. In addition, another comparison is made (using comparator 109) between address bits 18–24 in reg. 101 and the row information in the register 143 (FIG. 9) in the cache controller that contains address bits 18–24 from the last inpage operation. If either of the comparison operations do not result in a match, then the date is wholly contained in the cache memory 14. If both of these comparison operations result in a match, then the 128 byte block of data associated with the cache directory matched entry is partially located in tile cache memory and partially located in the inpage buffer, and further analysis must be made to determine which of the cache memory or inpage buffer actually contains the data. Specifically, four double words (one double word equals eight bytes of data) are located in the cache memory, while the remaining twelve double words are located in the inpage buffer. Each double word is logically addressable using address bits 25–28. The following describes how these double words are located and accessed in the preferred embodiment of the invention.

Each 128 byte block of data as it is moved from main memory to cache memory is subdivided into two 64 byte halves as defined by address bit 25. This subdivision is caused by how data is delivered from main memory during an inpage operation i.e. the data in each half is transferred in total before the data in other half is transferred. Register 143 in the cache controller contains address bits 25–26 from the last inpage operation and points to the first four double words that were transferred to the inpage buffer during the last inpage operation. A comparison is first performed between address bit 25 from this register 143 and address bit 25 delivered from the address registers/address translater 53. If a match does not occur, then the double word of interest is part of the 64 byte block wholly contained in the inpage buffer. After the determination is made that the double word of interest is located in the inpage buffer, an additional check is performed to determine if the inpage buffer is in the process of being filled with data from the last inpage operation. If the inpage buffer is still busy with a previous inpage operation, the processor/memory interface controller 60 initiates a delay control sequence which results in the processor being put in a wait state. Once this previous inpage operation has been completed, the processor/memory interface controller notifies the processor, and the processor reissues the same request for data. Once the previous inpage operation has completed or if no inpage operation was in progress, address bits 25–27 from the address register/address translater are used to address the inpage buffer and read out a pair of double word entries into IPB register 47. The contents of IPB register 47 are then routed through a pair of multiplexers 43 and 68 under control of the cache controller. Data arrives at the processor 26 as rapidly as if the data had been sent from the cache memory 14 if no delay occurred due to a completing inpage operation. It should be noted that data transfers from cache memory and the inpage buffer to the respective data transfers registers, storage data register 45 and IPB register 47, occur simultaneously with the processing of the address information by the cache/IPB directory controller 62 and the cache/IPB controller 50 to expedite the subsequent reading of data by the processor. However, because the cache/IPB controller 50 does not originally know the precise data which the processor has requested, the cache controller transfers all possible candidates to the respective registers awaiting final determination of the precise data. The candidates from the cache memory are determined as follows. A double word is read from each of four columns in the cache memory using address bits 18–28, 18–24 of which directly correspond to the four columns in the cache/IPB directory 52. These four double words of data are then latched into the Storage Data Register/IPB 45 and held until column match information from the cache directory is received by the cache/IPB controller and stored in a register 105. If the cache/IPB controller determines that the double word is located in cache memory 14, then the cache/IPB controller directs the appropriate double word out of the Storage Data Register 45 using the column match information, and routes it to the shifter 41 and into the processor. Two candidates from the inpage buffer are read using address bits 25–27, and are latched into IPB register 47. If the cache/IPB controller determines that the double word is located in the inpage buffer, then the cache/IPB controller directs the appropriate double word out of the IPB register 47 using address bit 28, and routes it to the shifter 41 and on to the processor 14.

If a match occurs on address bit 25, then the double word of interest is part of the 64 byte block which is partially contained in the inpage buffer and partially contained in the cache memory. Further calculation is required to determine whether the double word of interest is located in the inpage buffer or in the cache memory. Address bit 26 in the cache controller register 143 indicates the four double words contained in the inpage buffer from the 64 byte block. The other four double words from this 64 byte block are located in the cache memory. If the cache/IPB controller determines that the double word is located in the inpage buffer, the data is read from the inpage buffer as described above. However, if the cache/ IPB controller determines that the double word is located in cache memory, then data that was read out of the four cache array columns (corresponding to the four columns in the cache directory) using address bits 18–28 from the address register/address translater into the storage data register are selected. Then, the column match information from the cache directory controller is used by the cache/IPB controller to gate multiplexors to route the appropriate data from the storage data register by selecting one of the four double words in the data register corresponding to the four cache columns, and sending it to the shifter 41 and finally to the processor.

If a match does not occur in the cache/IPB controller between either the column information from the cache/IPB directory controller and saved column information or address bits 18–24 from the address register/address translation unit and saved address bits 18–24, then the cache controller determines that the cache line being accessed is located wholly in cache and no further address comparison using bits 25–26 is necessary. Data is routed from the cache memory to the processor as previously described.

If the cache directory controller determines that no match has occurred on any of the four column entries, then it notifies the cache/IPB controller and the main memory controller of the no match condition. If the inpage buffer is still busy with a previous inpage operation, the processor/memory interface controller 60 initiates a delay control sequence which results in the processor being put in a wait state. Once this previous inpage operation has been completed, the processor/memory interface controller notifies the processor, and the processor reissues the same request for data. The main memory controller 80 then initiates a fetch of a 128 byte block of data to be sent to the cache memory and the inpage buffer (an inpage operation). This fetch operation takes much longer than a fetch of data from the cache memory or the inpage buffer, and as a result, other operations can be performed while waiting for the data to be accessed from main memory.

The following description details operations which are started while the data fetch from memory is still in progress. The cache directory controller next chooses one of the four current cache directory entries associated with the four 128 byte blocks of data in cache recently compared to the data request address to replace with the new data being fetched from main memory based upon the status bits of each of the entries and the least recently used (LRU) bits that are also contained in each row of the cache directory. A valid or invalid entry in the cache directory as indicated by the status bits represents a 128 byte block in cache which either currently contains an unmodified copy of main memory data or unused data, respectively. A modified entry represents a 128 byte block of data which contains data that has been modified by the processor but not yet written into main memory. An off-line entry is a 128 byte address block in cache that has been permanently removed from use (for example due to a faulty cache memory cell). An invalid entry will be chosen over valid modified or off-line entries. If an invalid entry is not available, then a valid or modified entry is chosen based on the LRU bits. If an invalid or valid entry is chosen, then the data present in the corresponding memory locations in cache will be overwritten during the inpage operation. If a modified entry is chosen, then the data present in the corresponding memory locations in cache memory will be removed and stored in a swap buffer array 82 prior to being overwritten by the inpage operation to prevent loss of modified data which does not yet exist in main memory. In this type of cache data management, data updates from main memory are deferred until a 128 byte block of data which contains modified data is removed from cache memory to make room for a new 128 byte block. In the case of modified entry being chosen for replacement, the original 128 byte block from cache memory is moved from the cache memory to a swap buffer array 82 to make room for the new 128 byte block being fetched from main memory, and this operation is referred to as an outpage operation. The swap buffer array 80 is another temporary data storage memory to temporarily hold data during transfer between the cache memory and the main memory. As part of the outpage operation, the cache directory controller provides address bits 6–24 to the main memory controller which represent the 128 byte block of data being moved out of cache memory during the outpage operation. Bits 6–17 come from the cache directory entry associated with the outpage operation, and bits 18–24 are the same bits that were used to address the cache directory.

Before either the inpage or outpage operation occurs however, the contents of the inpage buffer are moved to the cache arrays. This operation is initiated by the cache controller once it has been notified of the no-match condition and is known as an inpage buffer unload operation. The inpage buffer has a very quick access time due to its small size (relative to the size of the cache memory) and as a result, two pairs of double words can be accessed from the inpage buffer in the period of time that it takes the cache memory to prepare for one write operation. These two pairs of double words are stored in IPB 47 and IPB 70 so that a total of four double words are presented to the input of the cache memory via bus 123 (see FIG. 2) (after gating through a cache multiplexer 72) at the moment when the cache memory is ready to undergo a write operation under control of the cache controller. Since twelve double words exist in the inpage buffer at the beginning of the inpage buffer unload operation, then only three write cycles to cache are required to completely transfer the contents of the inpage buffer to cache memory (four double words per cycle). During this transfer, the cache memory is addressed with an address counter 74 whose initial value of its most significant bits is set at the beginning of the unload operation to address bits 25–26 which were saved by the cache controller in reg 143 from the previous inpage operation (address bits 27–28 are not used in the cache during this write operation). This counter 74 will change both bits after the first write cycle to prepare for the second write cycle, and then change only the least significant of these two bits in preparation for the third write cycle. Address bits 18–24 from register 143 are also used to complete the address to the cache arrays. The inpage buffer is addressed by a three-bit counter 76 (same as 103 FIG. 9) whose most significant bits are also initially set at the beginning of the unload operation to address bits 25–26 which were saved by the cache controller and the least significant bit is set to zero. This counter increments the two least significant bits on a modulo four basis repeating five times while the most significant bit is changed only once, simultaneous with the first transition of the middle bit of the counter. In this manner, the two pairs of double words in the inpage buffer, associated with the 64 byte block split between cache and the inpage buffer, are unloaded first. Then the other 64 byte block wholly contained by the inpage buffer is unloaded. The entire inpage buffer unload operation occurs rapidly enough such that the timings of the outpage and inpage operations prior to the addition of the inpage buffer are not affected.

To continue the data transfer sequence, the data transfer between the cache memory, the inpage buffer 12, SDR 45, IPBs 47 and 70, swap buffer 82 and memory subsystem 19 occurs at the timing of the set of memory clocks (which operate at a faster cycle than provided by the set of processor clocks 18). It should be noted that U.S. Pat. No. 4,953,077 to Alvarez II et al. discloses the use of a set of processor or conventional system clocks for processor operations and a set of memory or fast-transfer clocks for the transfer of data from main memory to cache memory (but no inpage buffer). The present invention similarly uses the two sets of clocks. The entire U.S. Pat. No. 4,953,077 is hereby incorporated by reference as part of the present disclosure, and includes additional detail an the generation of the two sets of clocks.

If an outpage operation was directed by the cache/IPB directory controller 62, then the cache/IPB controller addresses the cache memory using the address bits 18–24 from the address register/address translater 53, and bits 25–27 are set to all zeros. A cache address counter 74 holds bits 25–27 and is incremented seven times using the memory clocks such that a total of eight pairs of double words are transferred from cache memory through the storage data register 45 and an error correction register 88 to the swap buffer array 82 under control of the cache/IPB directory controller 62 and the main storage controller 80 using the set of memory clocks for the data registers 45 and 88 and addressing and writing the swap buffer. The unloading of the data from the swap buffer occurs later, after the new data is written from main memory to cache memory and the inpage buffer.

The cache memory locations associated with the block of data just moved to the swap buffer are now free to accept new data from the main memory during an inpage operation, and the main memory is now ready to transfer the data to cache memory and the inpage buffer. An inpage operation begins once the transfer to the swap buffer has completed or once data becomes available from main memory if no outpage operation occurred (the data fetch from main memory was previously started so that the data is available without additional delay once the transfer to the swap buffer has completed). The main memory controller previously received and used address bits 6–26 from the address register/address translater to identify the data requested by the processor. Main memory is organized in a manner such that data for an inpage operation is fetched as two 64 byte blocks of data contained in two closely associated banks on a memory card. This requires use of bit 6–25 to initiate the data fetch. Bit 26 is saved and used to indicate which pair of double words is to be transferred first to cache memory (address bit 27 is forced to zero). One pair of double words (one quad word) is latched in memory data register 89, transferred to an error correction matrix 90 and error correction register 88, and then transferred to the storage data register 45 and finally into the cache memory. This pipelined data transfer occurs wholly under the control of the memory clocks on the main storage and cache controllers. Then, a second pair of double words (another quad word), is latched into the memory data register 89 and transferred to the cache memory 14 immediately following the first pair. The cache memory is initially addressed for the inpage operation with address bits 18–26 from the address register/address translater in preparation for the first write cycle. Bits 25–26 are latched to the most significant bits of the cache address counter (the least significant bit is initially set to zero) and after loading the first pair of double words into cache memory it will then set the least significant bit of the counter (corresponding to address bit 27) such that the second pair of double words are loaded into cache. The cache/IPB directory controller will now signal the clock selector to apply processor clocks to the cache memory. The processor/memory interface controller 60 will notify the processor that it can now read data from the cache memory. The cache/IPB directory controller 62 will update the selected cache/IPB directory entry with the new value of address bits 6–17 from the address register/address translater and will store the status bits indicating valid status for the entry. The cache/IPB controller 50 saves the column match information in register 64 and address bits 18–26 are changed (the middle bit of the cache address counter which corresponds to address bit 26 is inverted) to point to the first four double words to be stored in the inpage buffer and saved in reg. 143. Next, the remaining six pairs of double words will be transferred in this inpage operation. A third pair of double words is transferred as described above to MDR 89, and the error correction register 88 and then will be routed to IPB register 47. The most significant bits of the inpage buffer address counter 76 were loaded with address bits 25–26 from the address register/address translater, and the least significant bit was set to zero at the beginning of the inpage operation. The inpage buffer address counter started incrementing the two least significant bits modulo four in the same data transfer cycle as the cache address counter, and will point to the first pair of double words to be loaded into the inpage buffer during the third data transfer. The counter will increment in the same manner for the remaining double word transfers but will change bit 25 one time to switch to the other 64 byte block in preparation for the fifth and remaining double word transfers from memory. This address sequencing matches how the data is sequenced out of main memory. Once the data transfer to the inpage buffer is complete, the cache/IPB controller will switch the processor clocks to the inpage buffer and IPB registers, and allow the processor to access the inpage buffer.

When the processor 26 desires to write data into the cache memory, the processor sends a data write request to controller 60 and the virtual address to which the processor desires to write to translater 53. This address is processed in the same manner as described above for the data reads to determine where the data should be written i.e. the memory device which currently stores the data for that address. In the case of a directory column match, the data is routed to the cache memory or inpage buffer under control of the cache/IPB and cache/IPB directory controller through the appropriate demultiplexers and multiplexers to the write inputs of the cache memory or the inpage buffer. These write operations are analyzed as described for the read operation. In the case of a no directory column match (a miss), the inpage and possibly outpage control sequences are started, and the processor is allowed to write into the cache memory in the same manner once the first two pairs of double words from the inpage operation have been transferred into the cache memory. The directory status is changed to modified for the entry containing the data that is written once the processing unit completes the write operation.

The loading of four double words into the cache memory and twelve double words into the inpage buffer allow the processor to proceed with its read or write operation to cache memory prior to completion of the inpage operation. In many circumstances, the data contained in the cache memory after an inpage operation will not only consist of the data originally requested but also data in addresses immediately following the requested data. As a result, subsequent processor operations to the cache memory are likely to use some or all of the data stored in the cache during the start of the last inpage operation if the processor is using data in a sequential manner. Thus, typically the processor will not need to access the inpage buffer until the data in cache is exhausted, and in many circumstances, this delay is sufficient to allow the inpage operation to complete to the inpage buffer without causing any delay to the processor. If data is fetched or stored nonsequentially, subsequentially requested data may be resident in another 128 byte block which is wholly contained in the cache memory, and similarly, the inpage buffer will not have to be accessed until sometime after the inpage to the inpage buffer has been completed. Another advantage of dividing the 128 byte block of data between the inpage buffer and the cache memory is that the unloading of the inpage buffer to the cache memory can occur while the next 128 byte block of data is being fetched from the main memory and prepared for inpaging.

Figure 3A:
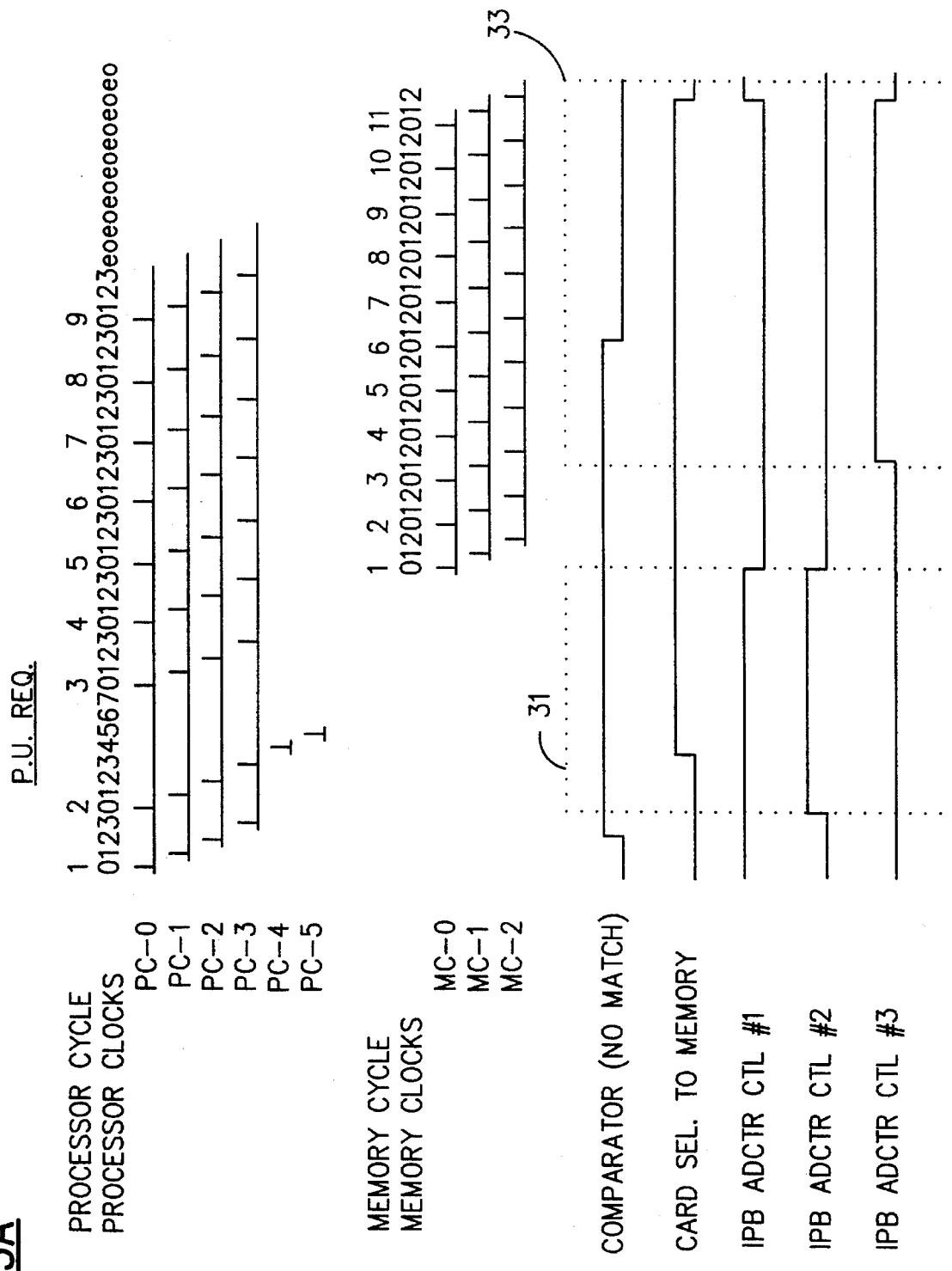
FIG. 3 is a timing diagram for the components illustrated in FIG. 2 for an unload of the inpage buffer and an inpage operation.
Figure 3B:
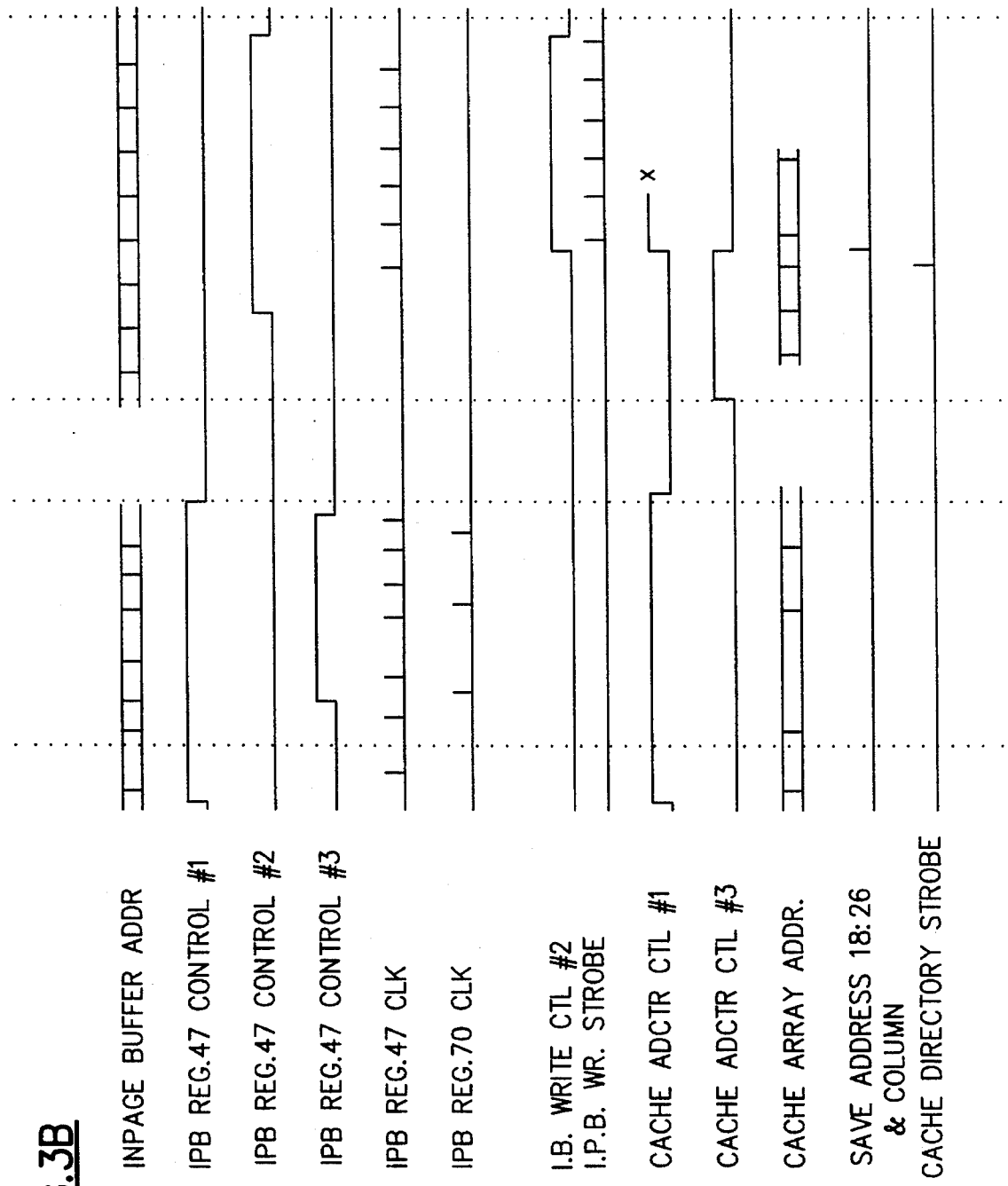

The following is a description of the timing of the foregoing events with reference to FIGS. 3–8. FIG. 3 illustrates the timing of events during an unload of the inpage buffer and an inpage operation resulting from a processor request of data. The sets of processor and memory clocks are gated fragments of even and odd pulse oscillators. The even and odd pulse oscillators are out of phase with each other by 180 degrees. The most common cycle time for the processor clocks is four pulses in duration whereas the most common cycle time for the memory clocks is three pulses. Processor clocks zero, one, two and three (PC-0, PC-1, PC-2 and PC-3) consist of one pulse every processor cycle, the zero, first, second and third pulses, respectively. Memory clocks zero, one and two (MC-0, MC-1 and MC-2) consist of one pulse every memory cycle, the zero, first and second pulses, respectively. Because the processor cycle is longer than the memory cycle, most cycles of the processor and memory clocks do not begin at the same time. Occasionally, an even number of extra timing pulses, such as, PC-4, PC-5, PC-6 and PC-7 are added to a processor cycle. Extra timing pulses are added when the processor processes certain microwords which take longer than four pulses to execute, and when the processor desires to align the start of one memory cycle and one processor cycle. In the later case, these additional pulses cause the memory and processor cycles to align two processor cycles later in the case of an inpage operation, and one processor cycle later in the case of an outpage operation. The "eoeo" pulses in FIG. 3 indicate that the processor clocks are alternately even and odd, but it is not certain without examination of the specific microprogram running on the processor when the eight pulse cycles are required.

FIG. 2 illustrates in more detail the circuitry 10 by which processor 26 accesses data from main memory 20 via inpage buffer 12 and cache memory 14. FIG. 3 illustrates the timing. Unless indicated otherwise, all of the following operations rise the set of processor clocks 18. When processor 26 requires data, the processor sends a data request to processor memory interface controller 60 via lines 147, and an address of the data to address register translater 53. Part of the data address is used to address a cache directory 52 which contains the addresses of all of the words currently stored in cache memory 14 and inpage buffer 12. The remaining bits of the address are compared with the contents of cache directory 52 using comparator 51 to determine if the requested data is located in either cache memory 14 or inpage buffer 12.

The processor data request described above initiates three operations which occur in parallel to attempt to read the requested data from either cache memory or the inpage buffer and determine if a hit or miss occurs. The first operation begin at the zero pulse of the first processor cycle (1PC-0) when the cache/IPB directory controller 62 begins to read the contents of the cache directory by presenting the address of the location in cache/IPB directory 52 to be read. The address in the location is read at the second pulse of the first processor cycle (1PC-2) and the hit or miss is determined at the third pulse of the first processor cycle (1PC-3) (see no match timing). The second operation occurs at 1PC-1; the address bits 25–27 are presented to the inpage buffer in an attempt to read the data required by the processor (see IPB address timing). At 1PC-2, the data read out of the inpage buffer is latched into IPB Reg 47. The third operation also occurs at 1PC-1 when address bits 18–28 are presented to the cache arrays in an attempt to read the data requested by the processor (see cache array address timing). Then, at 1PC-2, the data read out of the cache memory is latched into storage data register 45 (see SDR clock timing). It should be noted that it is not until the 1PC-3 pulse that the comparison made in the cache directory in the first operation described above is used to determine if the data actually resided in either cache memory or the inpage buffer. This parallel operation is intended to expedite the data access in the event of a hit.

In the case illustrated in FIG. 3, a miss is detected by the cache/IPB directory controller 62, and the cache/IPB controller 50 initiates an unload inpage buffer sequence as shown by the steps within dotted region 31 of FIG. 3 and main memory fetching of the next line of data. The main memory fetching begins by cache/IPB directory controller 62 sending a fetch command to main memory controller 80 and the address register (address translater 53 to send an address to the main memory controller). The set of processor clocks applied to main memory controller 80 to permit this communication with the cache/IPB directory controller 62 and the address register/address translator 53. Then, the main memory controller sends address bits 6–25 and the signal CARD SELECT TO MEMORY to main memory 20 at 2PC-4 to start the fetch of the data line while the contents of the inpage buffer are read into the cache memory as follows. The nature of the fetch operation is not critical to the present invention, and various types of fetch operations from main memory are well known in the art.

At 2PC-1, two double words are addressed from the inpage buffer ( see IPB address timing). These two double words are latched into IPR 47 at 2PC-2 (see IPB Reg 47 clk timing). Also at 2PC-1, the cache memory is presented with address bits 18–26 corresponding to the first four double words to be loaded into the cache memory from the inpage buffer registers (see cache memory address timing). Then, two events occur in parallel at 2PC-3; the contents of inpage buffer register 47 are read into inpage buffer register 70 (see IPB Reg 70 clk timing), and the inpage buffer 47 provided with another address (see IPB address timing). At 2PC-4, inpage buffer register 47 latches the second pair of double words read from the inpage buffer (see IPB Reg 47 clk timing). At 2PC-5, two operations occur in parallel; a third address is provided to the inpage buffer (see IPB address timing), and the contents of the inpage buffer registers 47 and 70 are written into the cache memory with the cache write strobe (see cache write strobe timing). At 3PC-0, the inpage buffer register 47 latches the third pair of double words from the inpage buffer (see IPB Reg 47 clk timing). At 3PC-1, three events occur in parallel; the inpage buffer register 70 latches the contents of inpage buffer register 47 (see IPB Reg 70 clk timing), the inpage buffer is presented with a fourth address of a fourth pair of double words (IPB address timing), and the cache arrays are presented with a second address in preparation for writing a second group of four double words into cache memory (see cache memory address timing). At 3PC-2, inpage buffer register 47 latches the fourth pair of double words read from the inpage buffer (see IPB Reg 47 clk timing). At 3PC-3, two events occur in parallel; an address is provided to the inpage buffer to read the fifth pair of double words (see IPB address timing), and the cache write strobe is issued to write the contents of inpage buffer registers 47 and 70 into the cache memory (see cache write strobe timing). The operations occurring during the fourth processor cycle are identical to those performed during the third processor cycle except that the fifth and sixth pairs of double words are transferred from the inpage buffer to the cache memory instead of the third and fourth pairs of double words. At this time, the six quad words have been transferred to cache memory to make room for the inpaging of data from the main memory.

The following is a further description of the circuitry and timing for the actual inpaging of data from main memory into the inpage buffer and cache memory (dotted box 33). The memory clocks are now applied to main memory, memory data register (MDR) 89, error correction register (ECR) 88, inpage buffer registers 47 and 70, storage data register 45, and address counters and write controls for cache memory and inpage buffer. At 2MC-2, the first pair of double words previously fetched from the main memory (and destined for the cache memory) is latched into the MDR register. At 3MC-1, the ECR latches the first pair of double words from the MDR through the ECC matrix. At 3MC-2, the second pair of double words (destined for the cache memory) is latched from main memory into the MDR register, At 4MC-0, the contents of the ECR register 88 are latched into the SDR 45 and an address for writing the first pair of double words into the cache memory is provided to the cache memory (see cache array address timing). At 4MC-1, the ECR latches the second pair of double words from the MDR through the ECC matrix. At 4MC-2, the MDR latches the third pair of double words (destined for the inpage buffer) from main memory, and also a cache write strobe is applied to the cache memory to write the contents of SDR which currently contains the first pair of double words. The SDR only accepts one further data transfer (for the second pair of double words) at 5MC-0, and the cache address is incremented in preparation for writing the second double word pair. The second double word pair is written into cache at 5MC-2 and is the last write to cache associated with the inpage operation. The cache address incremented at 6MC-0 and the value of the cache address is then saved along with the column match information at 6MC-1. At 8PC-0 (which is simultaneous with 5MC-0), a NOTIFY PROCESSOR signal is activated by the processor/memory interface controller to the processor for one cycle, indicating that the processor should reissue its data request in the following processor cycle. As described in more detail below, the processor can now access the data in cache memory. At 8PC-3, the cache directory is updated with address bits 6–17 from the address reg/address translater 53.

At 5MC-1 the third double word pair is latched into the ECR register 88 from the output of ECC Gen/Corr 90. At 6MC-0, simultaneous with the previously described cache directory operation, the inpage buffer register 41 latches the third double word pair from the ECR register and an address is provided to the inpage buffer in preparation for writing the third double word pair into the inpage buffer. The inpage buffer address counter which provides the address to the inpage buffer also was clocked at clock pulses 4MC-0 and 5MC-0 although the address was not used for a read or write operation with the inpage buffer at that time. The inpage buffer address counter started with the same values of address bits 25–27 as the cache address counter at 4MC-0 and therefore incremented both simultaneously during the above mentioned clock pulses and provides a straightforward means for setting and incrementing the inpage buffer address counter until the address is actually used for the third data transfer. At 6MC-2, the first write strobe is applied to the inpage buffer to write the third double word pair into the inpage buffer. The foregoing timing sequence relating to the inpage buffer address and write strobe is repeated until 6 double word pairs in total have been transferred into the inpage buffer. At 11MC-2, the BUFFER FULL signal is set which indicates that the inpage operation has completed and the inpage buffer is now free to accept a request for data from the processor.

The set of memory clocks was disconnected from the cache address counter 74, SDR 45 and cache write controller once the two pairs of double words were written to cache as previously described and the set or processor clocks is applied to them. At 9PC-0 and simultaneous with 6MC-1 in the foregoing timing sequence, the processor 26 reissues its request for data. An address is provided for reading the requested data at 9PC-1 and is identical to the address provided at 1PC-1. The SDR 45 latches data from the cache memory at 9PC-2 and this data is routed through the previously described multiplexers under control of the cache/IPB controller to the shifter 41 and then to the processor 26.

The foregoing events causing the unloading of the inpage buffer into the cache memory immediately followed by the writing of a new line of data from the main memory to another location in the cache memory and into the inpage buffer, were based on a scenario where the cache line being replaced had invalid or valid but not modified status. However, if this line had modified status, the modified data is saved by moving (outpaging) the modified data to the swap buffer 82 before the inpage operation and subsequently moving the data to the main memory immediately after the inpage operation is completed.

Figure 4A:
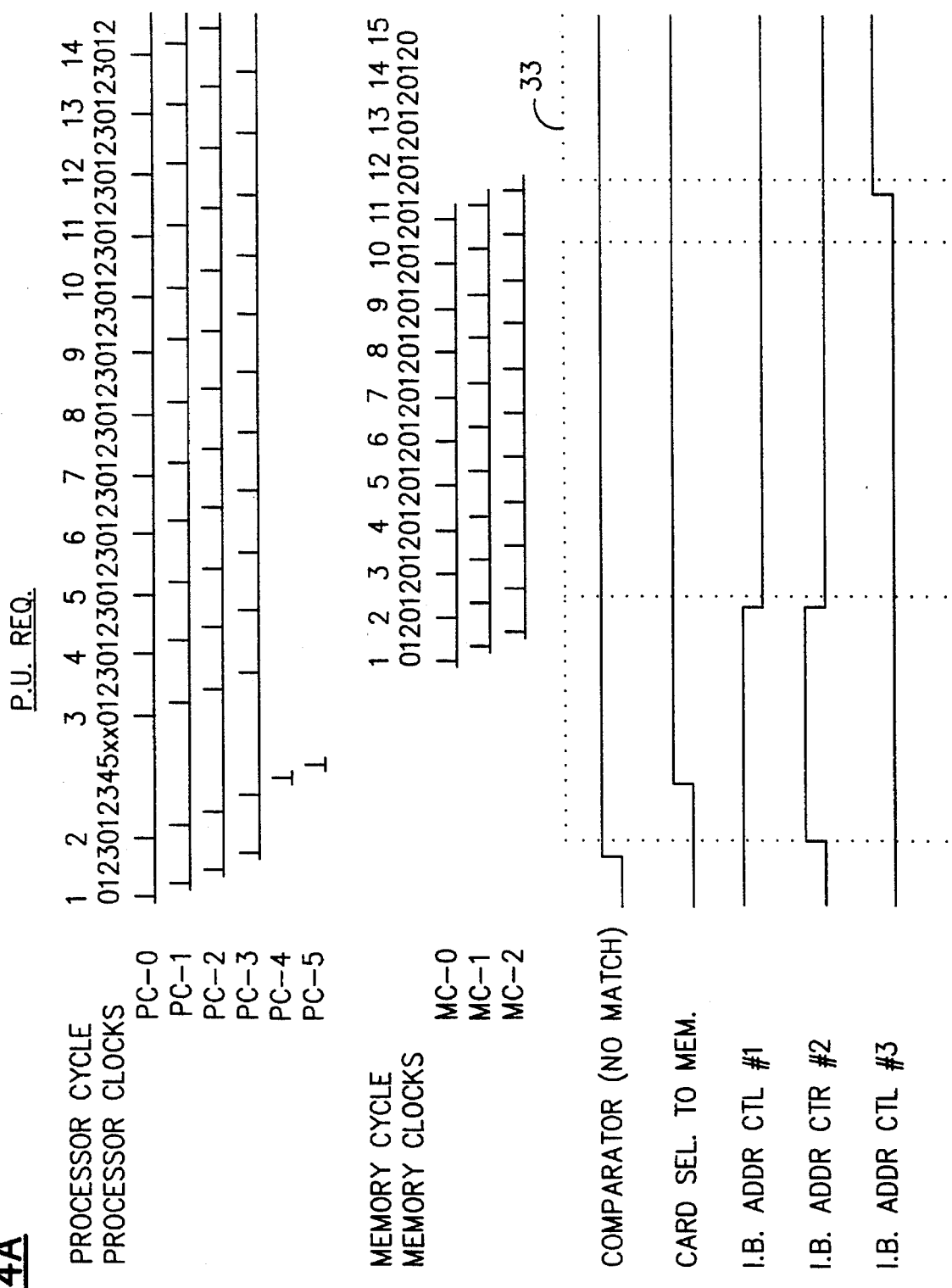
Figure 4B:
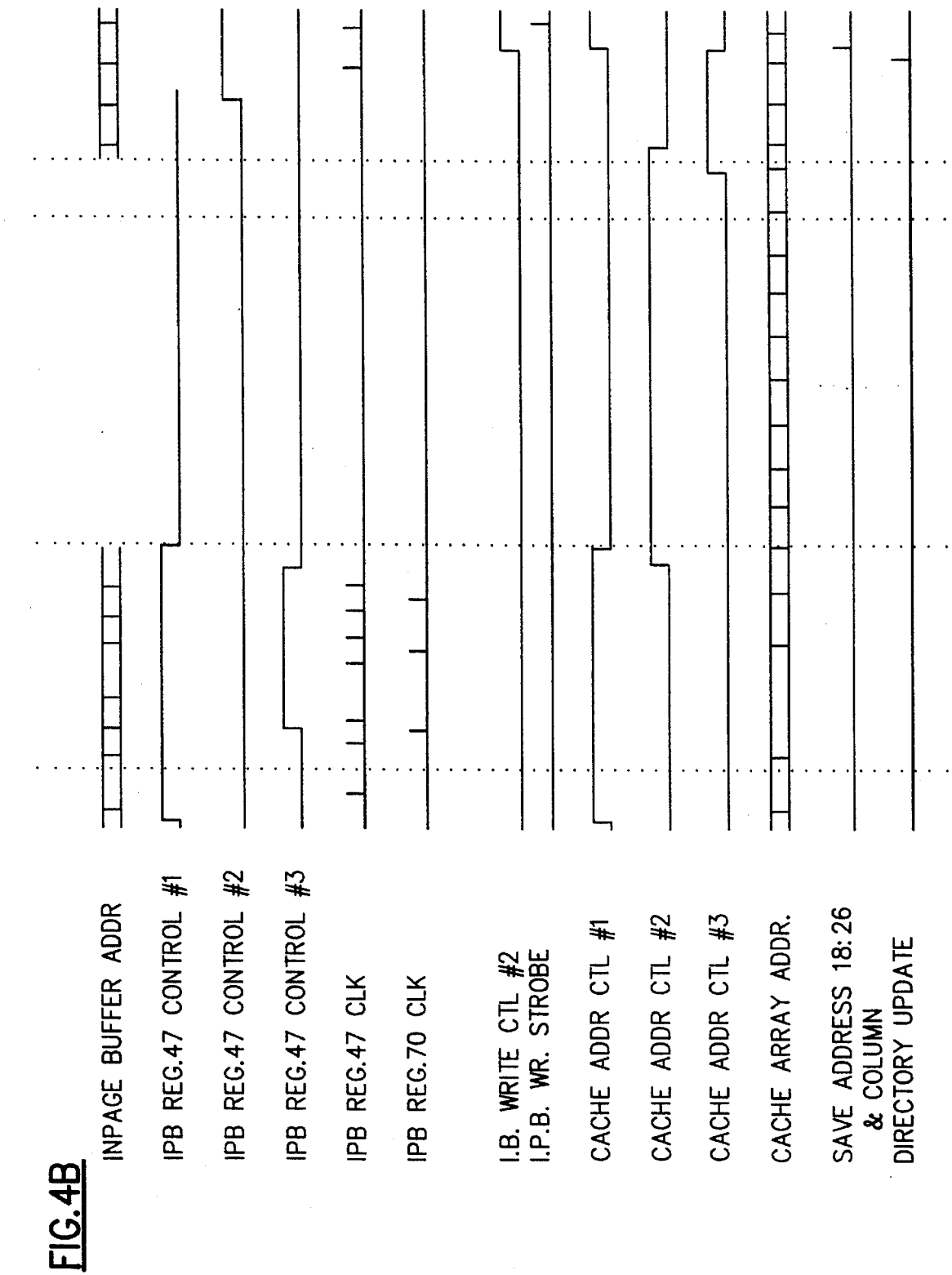

FIG. 4 illustrates the timing of events for the outpage operation resulting from a processor request for data. The previous unloading of the inpage buffer timing sequence occurs as described above in previous processor cycles two-four. The outpage operation begins at 2MC-1 when an address is provided to the cache memory to read out the first pair of double words to be transferred from cache to the swap buffer 82. At 3MC-0, the SDR 45 latches the first pair of double words read out of the cache memory and the main memory controller provides an address to the swap buffer 82. At 3MC-1, the address to the cache memory is incremented in the cache address counter such that the second pair of double words is read out of the cache arrays. At 3MC-2, a swap buffer write strobe occurs to write the contents of the SDR into the swap buffer. The foregoing timing sequence relating to the cache address, SDR, swap buffer address and swap buffer write strobe is repeated until 8 double word pairs have been transferred from the cache to the swap buffer. Address bits 6–17 of the directory entry associated with the outpage operation are transferred to the main memory controller at a later time (13PC-0) along with address bit 18–24 from the address register/address translater, during the subsequent inpage operation and prior to the directory update described with FIG. 3. The inpage operation described above immediately follows the outpage operation as shown, and uses the same timing sequences as described for FIG. 3. The relative processor and memory cycles change for when the inpage operation takes place and when the processor is notified that it can reissue and read data from cache memory.

After the inpage operation is completed, the eight quad words previously transferred to the swap buffer are transferred into main memory as follows. At 20MC-0, the main memory controller provides an address to the swap buffer of the first quad word to be read out and transferred to main memory. At 20MC-2, the MDR latches its data from the swap buffer, and at 21MC-1, the ECR latches the data from the MDR after transfer through the ECC matrix. At 22MC-0, the data from the ECP is received by a register (not shown) in the main memory. Tills sequence is then repeated three times until 64 bytes or 4 quad words are stored in the register within the main memory. Then, the main memory controller issues to the register a write strobe to write the data into the main memory. This process is then repeated for the remaining four quad words. During this operation where the swap buffer is unloaded to main memory, any processor requests for additional fetches from main memory are delayed until the unloading of the swap buffer is completed.

When a processor data request results in a hit, cache/IPB controller 50 must determine which of the cache memory 14 or inpage buffer 12 currently contains the data. FIG. 5 illustrates the timing of events for a processor read request where the requested data is found in the inpage buffer. Addresses are provided to both the cache memory and the inpage buffer at PC-1 as received from the address register/ address translater 53. At PC-2, both the IPB Reg. 1 and the SDR latch the data from the inpage buffer and cache memory, respectively. Comparators using the current and saved values of address bits 18-26 and the column match determine that the data is in the inpage buffer and activate GATE IPB TO PU shown at PC-3 time. This signal is used to transfer the contents of the IPB Reg. 47 to the shifter and then onto the processor. The processor can then issue another read or write request in the following processor cycle.

FIG. 6 illustrates the timing of events for a processor read request where the requested data is found in the cache. This timing sequence is identical to FIG. 5 except that GATE SDREG TO PU is activated instead of GATE IPB TO PU as a result of the compare operations previously described.

FIG. 7 illustrates the timing of of events for a processor write request where the data location to be written is found in the inpage buffer. Addresses are provided to both the cache memory and inpage buffer at PC-1 as received from the address register/address translater. Comparators using the current and saved values of address bits 18–26 and the column match determine that the data is in the inpage buffer and activate the INPAGE BUFFER WRITE CONTROL #1 at PC-3 time. The INPAGE BUFFER WRITE STROBE is then applied at PC-0 to write the data provided by the processor into the inpage buffer. The processor can then issue another read or write request in the following processor cycle.

FIG. 8 illustrates the timing of events for a processor write request where the data location to be written is found in the cache memory. This timing sequence is identical to FIG. 7 except that CACHE WRITE CT #1 is activated instead of INPAGE BUFFER WRITE CONTROL #1 and a CACHE WRITE STROBE occurs instead of a INPAGE BUFFER WRITE STROBE as a result of the compare operations previously described.

FIGS. 10A and 10B illustrate in detail the clock selector controller which applies the appropriate processor and memory clocks to the components illustrated in FIG. 2. The inputs to the clock selector controller are the processor and memory clocks (see FIGS. 1 and 3), and the outputs from the cache/IPB controller 50 (see FIGS. 2 and 9 for circuitry and 3–8 for timing) which select the appropriate processors and memory clocks to apply to the inpage buffer strobe, inpage buffer address counter, inpage buffer register 47 clock, cache memory strobe, cache memory address counter, and storage data register 45 clock (see FIG. 2).

Based on the foregoing, a data access system according to the present invention has been disclosed. However, numerous modification and substitutions may be made without deviating from the scope of the invention. For example, the present invention is extendable to multiprocessor systems. In such an extension, the system component shown in the Figures are all repeated for each of the processors with the exception of the memory subsystem 19. Data, address and control interfaces are as shown. Data integrity between the cache memories are maintained through additional means in the cache/IPB directory controllers. These means include a copy bit implemented for each entry in the cache/IPB directory to indicate potentially shared and unmodified 128 byte blocks of data between the processors. Also, a mechanism is required to send an address from another remote processor to search the cache/IPB directory to determine if a block of data requested by the other processor is in the cache memory associated with the local processor. Means would also be included to invalidate blocks of data in one cache memory and send them to another cache memory if required. The inpage buffer implementation as described above does not require any changes to the data integrity mechanisms because the cache/IPB directory contains the additional information necessary to insure data integrity for all of the 128 blocks contained in the cache memory as well as the one 128 byte block that is split between the cache memory and the inpage buffer. Therefore, the invention has been disclosed by way of illustration and not limitation, and reference should be made to the following claims to determine the scope of the invention.

We claim:

1. A computer system comprising:

a data processor;

a main memory;

a cache memory coupled to said main memory to receive data therefrom and coupled to said processor to transfer data thereto;

a data buffer coupled to said main memory to receive data therefrom and coupled to said cache memory to transfer data thereto;

means for transferring one part of a block of data from said main memory to said cache memory for access by said processor without prior transfer of said one part of said block of data to said data buffer, and then transferring all of said block of data except said one part to said data buffer while said processor has access to said one part of said block of data in said cache memory; and means for subsequently transferring said all of said block of data except said one part from said data buffer to said cache memory and combining said all of said block of data except said one part with said one part which is already stored in said cache memory, whereby said one part in said cache memory is not transferred from said data buffer to complete said block in said cache memory.

2. A computer system as set forth in claim 1 wherein said processor is coupled to said data buffer to read data therefrom.

3. A computer system as set forth in claim 1 wherein said one part of said block of data is transferred to said cache memory in response to a request by said processor for data included in said one part of said block of data.

4. A computer system as set forth in claim 3 wherein another part of said block of data which was transferred to said data buffer is likely to be needed by said processor soon after said processor processes said one part of said block of data in said cache memory.

5. A computer system comprising:

a data processor;

a main memory;

a cache memory coupled to said main memory to receive data therefrom and coupled to said processor to transfer data thereto;

a data buffer coupled to said main memory to receive data therefrom and coupled to said cache memory to transfer data thereto;

means for transferring one part of a block of data from said main memory to said cache memory for access by said processor without prior transfer of said one part of said block of data to said data buffer, and transferring another part of said block of data to said data buffer;

first clock means, coupled to said processor, for timing access by said processor to said one part of said block of data in said cache memory; and second clock means, coupled to said main memory, for timing transfer of data from said main memory to said cache memory and said data buffer, said first clock means having a different cycle time than said second clock means.

6. A method for providing access by a computer processor to data stored in memory, said method comprising the steps of:

transferring data requested by said processor to a cache, bypassing an inpage buffer;

after transferring the requested data to said cache, transferring other data to said inpage buffer; and providing access by said processor to said requested data in said cache while said other data is transferred to said inpage buffer; and wherein said processor reads said requested data in said cache at a first rate determined by a first clock cycle, and said other data is transferred to said inpage buffer at a second rate determined by a second, different clock cycle.

7. A method as set forth in claim 6 further comprising the step of fetching different data from said memory while transferring said other data from said inpage buffer to said cache.

8. A computer system comprising:

a data processor;

first clock means, coupled to said processor, for timing operation of said data processor;

a main memory;

a cache memory coupled to said main memory to receive data therefrom and coupled to said processor to transfer data thereto;

a data buffer coupled to said main memory to receive data therefrom, coupled to said cache memory to transfer data thereto, and coupled to said processor to transfer data thereto;

second clock means, coupled to said main memory, for timing transfer of data from said main memory to said cache memory and said data buffer, said first clock means having a different cycle time than said second clock means; and means for timing operation of said data buffer with said first clock means and said second clock means during different operations and timing operation of said cache memory with said first clock means and said second clock means during different operations.

9. A computer system as set forth in claim 8 wherein the timing means comprises means for applying said second clock means to time said data buffer to permit said main memory to transfer data to said data buffer, means for applying said first clock means to time said data buffer to permit said processor to read data from said data buffer, and means for applying said first clock means to time said cache memory to permit said processor to read data from said cache memory.

10. A computer system as set forth in claim 8 wherein the timing means comprises:

means for applying said second clock means to time said data buffer to permit transfer of main memory data to said data buffer, and applying said first clock means to time said cache memory while said second clock means is applied to time said data buffer, to permit said processor to read data from said cache memory while said main memory data is transferred to said data buffer.

11. A computer system as set forth in claim 8 further comprising means for transferring part of a block of main memory data to said cache memory without prior transfer of the block data part to said data buffer.

12. A computer system as set forth in claim 11 further comprising means for transferring a remaining part of said block of data to said data buffer.

13. A computer system as set forth in claim 8 further comprising means for transferring data requested by said processor to said cache memory bypassing said data buffer while said second clock means is applied to time said cache memory, and then applying said first clock means to time said cache memory to permit said processor to read said requested data from said cache memory.

14. A computer system as set forth in claim 13 further comprising means for transferring additional data associated with the requested data to said data buffer with timing by said second clock means while said processor reads said requested data from said cache memory with timing by said first clock means.

15. A computer system as set forth in claim 14 wherein said requested data and said additional data are part of one data page and were stored logically adjacent to each other in main memory before being transferred to said cache memory and said data buffer.

16. A computer system as set forth in claim 14 further comprising means for applying said first clock means to time said data buffer after transferring said additional data to said data buffer to permit said processor to access said additional data.

17. A computer system as set forth in claim 14 further comprising means for transferring said additional data from said data buffer to said cache memory.

18. A computer system as set forth in claim 17 wherein said timing means applies said first clock means simultaneously to time both said data buffer and said cache memory to permit said additional data to be transferred from said data buffer to said cache memory.

19. A computer system as set forth in claim 8 wherein said first clock means is applied simultaneously to time both said data buffer and said cache memory to permit said processor to read data from said data buffer and said cache memory.

20. A computer system as set forth in claim 8 wherein the timing means comprises:

means for controlling access to said cache memory and said data buffer; and means, coupled to said controlling means, for selecting either said first clock means or said second clock means to time said data buffer and said cache memory based at least in part on outputs of said controlling means.

21. A computer system as set forth in claim 8 wherein said first clock means and said second clock means are segments of a common base clock.

22. A computer system as set forth in claim 8 further comprising:

means for transferring part of a block of data to said cache memory and transferring another part of said block of data to said data buffer, and subsequently transferring said other part of said block of data from said data buffer to said cache memory while another block of data is fetched from said main memory.

23. A computer system as set forth in claim 22 wherein the timing means times the transfer of said other part of said block of data from said data buffer to said cache memory with said first clock means.

24. A computer system as set forth in claim 8 further comprising:

means for controlling data output from said main memory; and means for timing operation of the controlling means with said first clock means to enable said controlling means to respond to communications originating from said processor, and timing operation of said controlling means with said second clock means to enable data transfer from said main memory to said cache memory and said data buffer.

25. A computer system as set forth in claim 8 wherein said data buffer is an inpage buffer and has a substantially lower capacity than said cache memory.

26. A computer system as set forth in claim 8 wherein said first clock means comprises a plurality of non-overlapping, periodic timing signals having the same cycle time.

27. A computer system as set forth in claim 8 wherein said second clock means comprises a plurality of non-overlapping, periodic timing signals having the same cycle time.

28. A computer system comprising:

a data processor;

first timing means, coupled to said processor, for timing operation of said data processor;

a main memory;

a cache memory coupled to said main memory to receive data therefrom and coupled to said processor to transfer data thereto;

a data buffer coupled to said main memory to receive data therefrom, coupled to said cache memory to transfer data thereto, and coupled to said processor to transfer data thereto;

second timing means, coupled to said main memory, for timing transfer of main memory data to said cache memory and said data buffer, said first timing means having a different cycle time than said second timing means; and means for applying said second timing means to time said data buffer to permit transfer of data originating from said main memory to said data buffer, and applying said first timing means to time said cache memory while said second timing means times said data buffer, to permit said processor to read data from said cache memory while said data originating from said main memory is transferred to said data buffer.

* * * * *